(12) United States Patent
Matsui et al.

(10) Patent No.: US 11,483,145 B2
(45) Date of Patent: Oct. 25, 2022

(54) KEY EXCHANGE DEVICE, KEY EXCHANGE SYSTEM, KEY EXCHANGE METHOD, AND KEY EXCHANGE PROGRAM FOR EXCHANGING A KEY WITH ANOTHER DEVICE

(71) Applicant: NIPPON TELEGRAPH AND TELEPHONE CORPORATION, Chiyoda-ku (JP)

(72) Inventors: Masahiro Matsui, Musashino (JP); Yuki Okano, Musashino (JP); Tetsutaro Kobayashi, Musashino (JP); Reo Yoshida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 163 days.

(21) Appl. No.: 16/761,600

(22) PCT Filed: Nov. 9, 2018

(86) PCT No.: PCT/JP2018/041666
§ 371 (c)(1),
(2) Date: May 5, 2020

(87) PCT Pub. No.: WO2019/093478
PCT Pub. Date: May 16, 2019

(65) Prior Publication Data
US 2020/0274704 A1 Aug. 27, 2020

(30) Foreign Application Priority Data
Nov. 10, 2017 (JP) .............................. JP2017-217291

(51) Int. Cl.
*H04L 9/08* (2006.01)
*H04L 9/06* (2006.01)
(Continued)

(52) U.S. Cl.
CPC .......... *H04L 9/0861* (2013.01); *H04L 9/0631* (2013.01); *H04L 9/085* (2013.01); *H04L 9/3242* (2013.01); *H04L 63/061* (2013.01)

(58) Field of Classification Search
CPC ..... H04L 9/0861; H04L 9/0631; H04L 9/085; H04L 9/3242; H04L 63/061
(Continued)

(56) References Cited

U.S. PATENT DOCUMENTS 9,172,529 B2 * 10/2015 Zaverucha ............ H04L 9/0869
2004/0083368 A1 * 4/2004 Gehrmann ............ H04L 9/3226
713/171
(Continued)

FOREIGN PATENT DOCUMENTS

DE 60310437 T2 * 9/2007 ............ H04L 9/0841
JP 2006-121215 A 5/2006

OTHER PUBLICATIONS

Yoneyama et al., "Multi-cast Key Distribution: Scalable, Dynamic and Provably Secure Construction", ProvSec, 2016, pp. 207-226.
(Continued)

*Primary Examiner* — Bryan F Wright
(74) *Attorney, Agent, or Firm* — Oblon, McClelland, Maier & Neustadt, L.L.P.

(57) ABSTRACT

A key exchange device is provided that includes: a shared secret key storage in which shared secret information $mk_i^k$ which is information different from a secret key of the key exchange device is stored; an authentication information addition unit that generates authentication information $\sigma_i$, by which authentication is performed and falsification is detected, for key exchange information $e_i$, which is output to the outside, by using the shared secret information $mk_i^k$; and an authentication information verification unit that receives key exchange information $e_s$ and authentication information $\sigma_s$ corresponding to the key exchange information $e_s$ from the outside, verifies the authentication information $\sigma_s$ using the shared secret information $mk_i^k$, and, if the authentication information $\sigma_s$ is not successfully verified, stops a key exchange, and the shared secret information $mk_i^k$ is a value that is used in a generation process in a key exchange.

8 Claims, 3 Drawing Sheets

(51) Int. Cl.
*H04L 9/32* (2006.01)
*H04L 9/40* (2022.01)

(58) Field of Classification Search
USPC .......................................................... 713/171
See application file for complete search history.

(56) References Cited

U.S. PATENT DOCUMENTS

| 2006/0294575 | A1* | 12/2006 | Rogers | H04L 63/0428 |
| | | | | 726/1 |
| 2016/0065370 | A1 | 3/2016 | Le Saint et al. | |
| 2016/0218875 | A1 | 7/2016 | Le Saint et al. | |
| 2018/0026787 | A1 | 1/2018 | Le Saint et al. | |

OTHER PUBLICATIONS

Barnes et al., "The Messaging Layer Security (MLS) Protocol", Network Working Group, Internet-Draft, Oct. 2018, pp. 1-44.
Yoneyama et al., "Exposure-Resilient Identity-Based Dynamic Multi-Cast Key Distribution", IEICE Trans. Fundamentals, vol. E101-A, No. 6, Jun. 2018, pp. 929-944.
International Search Report dated Jan. 29, 2019 in PCT/JP2018/041666 filed Nov. 9, 2018, 2 Pages.
Tetsutaro Kobayashi, et al., "ID-based Scalable and Dynamic Multi-Cast Key Distribution for secure business chat system," 2017 Symposium on Cryptography and Information Security (SCIS2017), Jan. 2017, 11 Pages.
Kazuki Yoneyama, et al., "Multi-Cast Key Distribution: Scalable, Dynamic and Provably Secure Construction," Proc. Of ProvSec 2016, Nov. 2016, 28 Pages.
Atsushi Fujioka, et al., "Strongly Secure Authenticated Key Exchange from Factoring, Codes, and Lattices," Des. Codes Cryptography, vol. 76, No. 3, 2015, 33 Pages.

* cited by examiner

US 11,483,145 B2

KEY EXCHANGE DEVICE, KEY EXCHANGE SYSTEM, KEY EXCHANGE METHOD, AND KEY EXCHANGE PROGRAM FOR EXCHANGING A KEY WITH ANOTHER DEVICE

TECHNICAL FIELD

The present invention relates to a communication device that communicates with another communication device and a communication system, which the communication device executes, in a key exchange technique in the field of information communications.

BACKGROUND ART

As a technique of sharing the same key (a session key), which is used for encryption and so forth, between a plurality of devices, there is a key exchange protocol. In some of the key exchange protocols, a session key is exchanged using a secret key (a long-term secret key) which is used for a long term.

As one example thereof, there is a two-round dynamic multi-cast key distribution protocol (hereinafter also referred to as a KY protocol; see Non-patent Literature 1). The use of the KY protocol makes it possible to efficiently exchange a session key again in accordance with a user's dynamic change (for example, participating in or leaving a call or message group). In addition, the feature of the KY protocol is that, no matter how large the number of users becomes, each user's costs (such as calculation costs and communication costs) required for a key exchange are constant.

PRIOR ART LITERATURE

Non-Patent Literature

Non-patent Literature 1: K. Yoneyama, R. Yoshida, Y. Kawahara, T. Kobayashi, H. Fuji, and T. Yamamoto: "Multicast Key Distribution: Scalable, Dynamic and Provably Secure Construction", Proc. of ProvSec 2016, pp. 207-226, Nanjing, China, Nov. 2016.

SUMMARY OF THE INVENTION

Problems to be Solved by the Invention

In a protocol in which a key exchange is performed using a long-term secret key, after a long-term secret key is leaked to an attacker, the attacker can sometimes make an attack by participating in a key exchange by posing as the device from which the long-term secret key was leaked. Then, after a long-term secret key in a key exchange technique is leaked, a session key is leaked by spoofing.

For example, also in the KY protocol, an attacker can acquire a session key after a long-term secret key is leaked. The KY protocol uses a star network in which a plurality of users communicate with a server which is the center of the network. At the time of a key exchange, the users and the server perform a session key exchange between the users by using long-term secret keys and short-term secret keys. However, the long-term secret key is stored on nonvolatile memory for a long time and used. Therefore, it is necessary to store the long-term secret key securely in such a way that the long-term secret key is not leaked to an attacker. The security of the KY protocol has the following features:

1. Ephemeral key exposure resilience: Even when a short-term secret key of a user is leaked, a session key before the leakage is secure;
2. Time-based backward secrecy: Even when session keys before and after a certain session key are leaked, it is impossible to infer the certain session key itself; and
3. Strong server key forward secrecy: Even when a long-term secret key of a user or the server is leaked, a session key of a session completed before the leakage is secure.

As described in 3. above, in the KY protocol, even when a long-term secret key is leaked, information on a session key shared in a session conducted before the leakage is not leaked. However, there is a possibility that a session key shared in a session that is conducted after the long-term secret key is leaked falls into the hands of an attacker. Specifically, if a long-term secret key of the server is leaked, the attacker can participate in a key exchange, posing as the server. After the attacker poses as the server, a session key is shared also with the attacker, who secretly participates in a key exchange when a session is conducted between the users. Moreover, if a long-term secret key of a user is leaked, the attacker can participate in a session, posing as the user, which causes a session key to be shared with the attacker.

As described above, in actuality, key exchange protocols include a protocol in which an attacker acquires a session key after a long-term secret key is leaked to the attacker. Under the present circumstances, a case where information is leaked due to a break-in into a server, a user terminal, or the like is easily conceivable. To prevent such a problem, the server and users have to store a long-term secret key securely so as not to leak the long-term secret key. Secure storage becomes a burden on the server and users.

An object of the present invention is to provide a key exchange device, a key exchange system, a key exchange method, and a key exchange program that can prevent a session key from being inferred after a long-term key is leaked.

Means to Solve the Problems

To solve the above-described problem, according to an aspect of the present invention, on the assumption that i≠s, j is the number of times a key exchange is performed, and k is any one of integers greater than or equal to 0 and less than j, a key exchange device includes: a shared secret key storage in which shared secret information $mk_i^k$ which is information different from a secret key of the key exchange device is stored; an authentication information addition unit that generates authentication information $\sigma_i$, by which authentication is performed and falsification is detected, for key exchange information $e_i$, which is output to the outside, by using the shared secret information $mk_i^k$; and an authentication information verification unit that receives key exchange information $e_s$ and authentication information $\sigma_s$ corresponding to the key exchange information $e_s$ from the outside, verifies the authentication information $\sigma_s$ using the shared secret information $mk_i^k$, and, if the authentication information $\sigma_s$ is not successfully verified, stops a key exchange. The shared secret information $mk_i^k$ is a value that is used in a generation process in a key exchange.

To solve the above-described problem, according to another aspect of the present invention, a key exchange system includes a key exchange server device and n key exchange devices i. On the assumption that i≠s, i=1, 2, . . . , n, j is the number of times a key exchange is performed, and k is any one of integers greater than or equal to 0 and less than j, each key exchange device i includes: a shared secret key storage in which shared secret information $mk_i^k$ which is information different from a to secret key of the key exchange device i is stored; an authentication information addition unit that generates authentication information $\sigma_i$, by which authentication is performed and falsification is detected, for key exchange information $e_i$, which is output to the outside, by using the shared secret information $mk_i^k$; and an authentication information verification unit that receives key exchange information $e_{s\_i}$ and authentication information $\sigma_{s\_i}$ corresponding to the key exchange information $e_{s\_i}$ from the outside, verifies the authentication information $\sigma_{s\_i}$ using the shared secret information $mk_i^k$, and, if the authentication information $\sigma_{s\_i}$ is not successfully verified, stops a key exchange. The key exchange server device includes: a second shared secret key storage in which shared secret information $mk_1^k, \ldots, mk_n^k$ which is information different from a secret key of the key exchange server device is stored; a second authentication information addition unit that generates authentication information $\sigma_{s\_1}, \ldots, \sigma_{s\_n}$, by which authentication is performed and falsification is detected, for key exchange information $e_{s\_1}, \ldots, e_{s\_n}$, which is output to the outside, by using the shared secret information $mk_1^k, \ldots, mk_n^k$; and a second authentication information verification unit that receives key exchange information $e_1, \ldots, e_n$ and authentication information $\sigma_1, \ldots, \sigma_n$ corresponding to the key exchange information $e_1, \ldots, e_n$ from the outside, verifies the authentication information $\sigma_1, \ldots, \sigma_n$ using the shared secret information $mk_1^k, \ldots, mk_n^k$, and, if certain authentication information is not successfully verified, stops a key exchange which is performed between the key exchange server device and a key exchange device whose authentication information has not been successfully verified.

To solve the above-described problem, according to still another aspect of the present invention, a key exchange method uses a key exchange device. On the assumption that i≠s, k is any one of integers greater than or equal to 0, and, in a shared secret key storage of the key exchange device, shared secret information $mk_i^k$ which is information different from a secret key of the key exchange device is stored, the key exchange method includes: an authentication information addition step in which the key exchange device generates authentication information $\sigma_i$, by which authentication is performed and falsification is detected, for key exchange information $e_i$, which is output to the outside, by using the shared secret information $mk_i^k$; and an authentication information verification step in which the key exchange device receives key exchange information $e_s$ and authentication information $\sigma_s$ corresponding to the key exchange information $e_s$ from the outside, verifies the authentication information $\sigma_s$ using the shared secret information $mk_i^k$, and, if the authentication information $\sigma_s$ is not successfully verified, stops a key exchange.

To solve the above-described problem, according to yet another aspect of the present invention, a key exchange method uses a key exchange server device and n key exchange devices i. On the assumption that i≠s, i=1, 2, ..., n, k is any one of integers greater than or equal to 0, in a shared secret key storage of each key exchange device i, shared secret information $mk_i^k$ which is information different from a secret key of the key exchange device i is stored, and, in a shared secret key storage of the key exchange server device, shared secret information $mk_1^k, \ldots, mk_n^k$ which is information different from a secret key of the key exchange server device is stored, the key exchange method includes: an initial shared secret key sharing step in which the key exchange server device and the n key exchange devices i share the shared secret information $mk_i^k$; an authentication information addition step in which the key exchange device i generates authentication information $\sigma_i$, by which authentication is performed and falsification is detected, for key exchange information $e_i$, which is output to the outside, by using the shared secret information $mk_i^k$; a second authentication information verification step in which the key exchange server device receives key exchange information $e_1, \ldots, e_n$ and authentication information $\sigma_1, \ldots, \sigma_n$ corresponding to the key exchange information $e_1, \ldots, e_n$ from the outside, verifies the authentication information $\sigma_1, \ldots, \sigma_n$ using the shared secret information $mk_1^k, \ldots, mk_n^k$, and, if certain authentication information is not successfully verified, stops a key exchange which is performed between the key exchange server device and a key exchange device whose authentication information has not been successfully verified; a second authentication information addition step in which the key exchange server device generates authentication information $\sigma_{s\_1}, \ldots, \sigma_{s\_n}$, by which authentication is performed and falsification is detected, for key exchange information $e_{s\_1}, \ldots, e_{s\_n}$, which is output to the outside, by using the shared secret information $mk_1^k, \ldots, mk_n^k$; and an authentication information verification step in which the key exchange device i receives key exchange information $e_{s\_i}$, and authentication information $\sigma_{s\_i}$ corresponding to the key exchange information $e_{s\_i}$ from the outside, verifies the authentication information $\sigma_{s\_i}$ using the shared secret information $mk_i^k$, and, if the authentication information $\sigma_{s\_i}$ is not successfully verified, stops a key exchange.

Effects of the Invention

According to the present invention, it is possible to prevent a session key from being inferred after a long-term key is leaked.

DETAILED DESCRIPTION OF THE EMBODIMENTS

Figure 1:
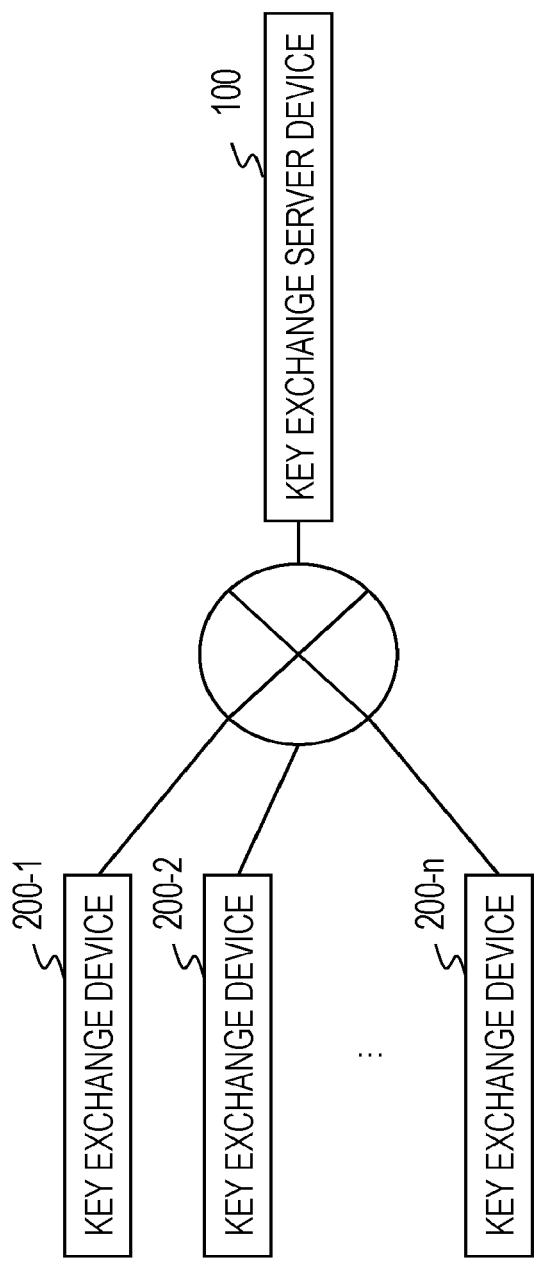
FIG. 1 is a configuration diagram of a key exchange system according to a first embodiment.

Hereinafter, embodiments of the present invention will be described. It is to be noted that, in the drawings which are used in the following description, component units having the same function and steps in which the same processing is performed are identified with the same characters and overlapping explanations are omitted. In the following description, symbols such as "∧" and "~" which are used in text are supposed to be written directly above the immediately preceding letters, but, due to a restriction imposed by text notation, they are written in positions immediately following these letters. In formulae, these symbols are written in their proper positions. Moreover, it is assumed that processing which is performed element by element of a vector and a matrix is applied to all the elements of the vector and the matrix unless otherwise specified.

<Point of a First Embodiment>

In a first embodiment, a key exchange protocol is proposed in which authentication using two types of information, information (shared secret information =a MAC key) used in the course of an earlier session key exchange and a long-term secret key, is performed to prevent an attacker from posing as a user or a server.

In the present embodiment, a fixed shared secret information scheme will be described.

In the present embodiment, the following steps are added to the existing key exchange protocol before a key exchange step.

(Initial Shared Secret Key Sharing Step)

A key exchange device and another key exchange device between which a key exchange is performed create long-term secret keys SSKs and long-term public keys SPKs of their own only when they do not have long-term secret keys which can be used for authentication, store the SSKs, and exchange the SPKs while preventing falsification using a technique such as PKI. Then, the key exchange device and the other key exchange device between which a key exchange is performed perform key sharing while adding information that prevents spoofing and falsification by using the long-term secret keys SSKs of their own, share an initial shared secret key $mk_i^0$, and store the initial shared secret key $mk_i^0$.

Next, the step is modified as follows at the time of transmission and reception, which are performed between key exchange devices, in the existing key exchange algorithm.

(Transmission-Reception-Time Step in a Key Exchange)

Assume that a j-th key exchange is performed between a key exchange device 200-$i$ and another key exchange device 200-$m$ between which a key exchange is performed. In this case, at the time of transmission of information, each key exchange device transmits information which is necessary between the key exchange devices after adding information thereto for detection of spoofing and falsification by using a shared secret key $mk_i^k$ ($0 \leq k < j$) in a key exchange performed prior to the j-th key exchange. At the time of reception of information, each key exchange device first checks the information for spoofing and detection by using the shared secret key $mk_i^k$; if the information is not correct, each key exchange device stops the key exchange algorithm and, if the information is correct, each key exchange device continues the key exchange algorithm.

It is to be noted that the present embodiment is based on the assumption that, at the time of the initial shared secret key sharing step, the algorithm can be ended properly without attacker involvement. As the transmission-reception-time step in a key exchange, a key exchange device and another key exchange device between which a key exchange is performed add, to information which is to be transmitted therebetween, information for preventing spoofing and falsification by using the SSKs of their own and the shared secret key $mk_i^k$ in a key exchange performed prior to the j-th key exchange. Thus, even when a long-term secret key is leaked, since the shared secret key $mk_i^k$ is securely stored, an attacker cannot forge information for detecting spoofing and falsification in each communication at the time of a key exchange. This makes it possible for the key exchange device and the other key exchange device between which a key exchange is performed to prevent spoofing by an attacker. Therefore, it is possible to solve the problem of leakage of a session key which is caused by leakage of a long-term secret key.

<Notation System>

Hereinafter, the notation system of symbols which are used in the present embodiment will be described.

$U:=\{u_1, u_2, \ldots, u_N\}$ A set of users belonging to a group
$u:=\{u_1, u_2, \ldots, u_n | u_i \in U\}$ A set of users who participate in a key exchange.
It is assumed that all or some of the users belonging to the group participate in a key exchange. Thus, $n \leq N$.
$(sk_i, pk_i)$ A secret key and a public key of $u_i$
$(sk_s, pk_s)$ A secret key and a public key of a server
$mk_i^j$ A shared secret key (in the present embodiment, a message authentication code (MAC) key generated with a security parameter k) in a j-th key exchange, which is shared between $u_i$ and the server
p A prime number
G A finite cyclic group of order p
g, h Generators of G
κ (A security parameter
$Kspace_\kappa$ A κ-bit key space
TCR: $\{0, 1\}^* \to \{0, 1\}^\kappa$ A target-collision resistant hash function
tPRF: $\{0, 1\}^\kappa \times Kspace_\kappa \times Kspace_\kappa \times \{0, 1\}^\kappa \to Z_p$ A twisted pseudo-random function (see Reference Literature 1)
tPRF': $\{0, 1\}^\kappa \times Kspace_\kappa \times Kspace_\kappa \times \{0, 1\}^\kappa \to Z_p$ A twisted pseudo-random function
F: $\{0, 1\}^\kappa \times G \to Z_p^2$ A pseudo-random function
F': $\{0, 1\}^k \times Z_p \to Kspace_\kappa$ A pseudo-random function
F'': $\{0, 1\}^\kappa \times Kspace_\kappa \to \{0, 1\}^\kappa$ A pseudo-random function
F''': $\{0, 1\}^\kappa \times Kspace_\kappa \to Z_p$ A pseudo-random function
$TF_{ti}:=\{time_{ti\_1}; time_{ti\_2}, \ldots, time_{ti\_m}\}$ A set of times in a specific segment (Time Frame), ti=1, 2, . . . , fn
$TF:=\{TF_1, TF_2, \ldots, TF_{fn}\}$ A set of Time Frames
PRF: $\{0, 1\}^* \to \{0, 1\}^\kappa$ A pseudo-random function
(Reference Literature 1) Atsushi Fujioka, Koutarou Suzuki, Keita Xagawa, and Kazuki Yoneyama. "Strongly secure authenticated key exchange from factoring, codes, and lattices". Des. Codes Cryptography, 76(3):469-504, 2015.

First Embodiment

FIG. 1 is a configuration diagram of a key exchange system according to the first embodiment.

The key exchange system includes a key exchange server device 100 and n key exchange devices 200-$i$. The devices are connected via a communication line or the like and can communicate with each other. It is assumed that i=1, 2, . . . , n.

The key exchange server device 100 and the n key exchange devices 200-$i$ are each a special device configured as a result of a special program being read into a publicly known or dedicated computer including, for example, a central processing unit (CPU), a main storage unit (random access memory: RAM), and so forth. The key exchange server device 100 and the n key exchange devices 200-$i$ each execute each processing under the control of the central processing unit, for example. The data input to the key exchange server device 100 and the n key exchange devices 200-$i$ and the data obtained by each processing are stored in the main storage unit, for instance, and the data stored in the main storage unit is read into the central processing unit when necessary and used for other processing. At least part of each processing unit of each of the key exchange server device 100 and the n key exchange devices 200-$i$ may be configured with hardware such as an integrated circuit. Each storage of each of the key exchange server device 100 and the n key exchange devices 200-$i$ can be configured with, for example, a main storage unit such as random access memory (RAM), an auxiliary storage unit configured with a hard disk, an optical disk, or a semiconductor memory device such as flash memory, or middleware such as a relational database or a key-value store.

Figure 2:
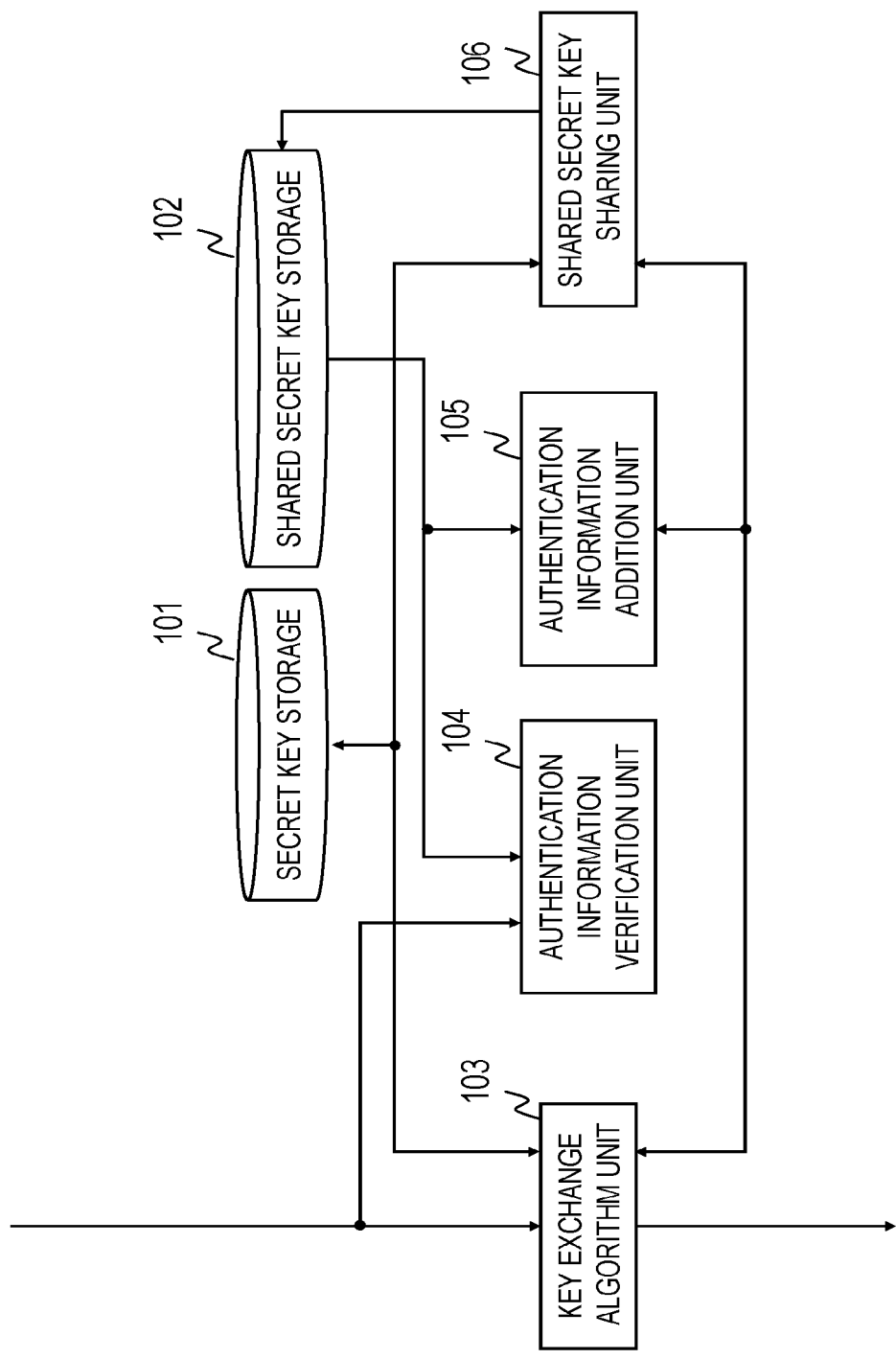
FIG. 2 is a functional block diagram of a key exchange server device according to the first embodiment.

FIG. 2 shows a functional block diagram of the key exchange server device 100. The key exchange server device 100 includes a secret key storage 101, a shared secret key storage 102, a key exchange algorithm unit 103, an authentication information verification unit 104, an authentication information addition unit 105, and a shared secret key sharing unit 106. First, the outline of processing which is performed in each unit will be described.

<Secret Key Storage 101>

In the secret key storage 101, a secret key of the key exchange server device 100 is stored.

<Shared Secret Key Storage 102>

In the shared secret key storage 102, shared secret information $mk_1^{k-1}, \ldots, mk_n^{k-1}$, which is information different from the secret key of the key exchange server device 100 and can be shared with the key exchange devices 200-$i$, is stored. In the present embodiment, k−1=0 to fix the shared secret information.

<Key Exchange Algorithm Unit 103>

The key exchange algorithm unit 103 accepts key exchange information $e_1, \ldots, e_n$ from the outside (the key exchange devices 200-$i$) as input, outputs related information x, which is generated in the course of a key exchange, to the shared secret key sharing unit 106, and outputs key exchange information $e_{s\_1}, \ldots, e_{s\_n}$, which is necessary for a key exchange, to the outside (the key exchange devices 200-$i$).

<Authentication Information Verification Unit 104>

The authentication information verification unit 104 verifies, using authentication information $\sigma_1, \ldots, \sigma_n$ from the outside (the key exchange devices 200-$i$) as input, the authentication information $\sigma_1, \ldots, \sigma_n$ by using the shared secret information $mk_1^{k-1}, \ldots, mk_n^{k-1}$. If certain authentication information is not successfully verified, the authentication information verification unit 104 stops the key exchange algorithm which is executed between the key exchange server device 100 and the key exchange device whose authentication information has not been successfully verified.

<Authentication Information Addition Unit 105>

The authentication information addition unit 105 generates, using the key exchange information $e_{s\_1}, \ldots, e_{s\_n}$ output from the key exchange algorithm unit 103 as input, authentication information $\sigma_{s\_1}, \ldots, \sigma_{s\_n}$, by which authentication is performed and falsification is detected, for the key exchange information $e_{s\_1}, \ldots, e_{s\_n}$ by using the shared secret information $mk_1^{k-1}, \ldots, mk_n^{k-1}$ and outputs the authentication information $\sigma_{s\_1}, \ldots, \sigma_{s\_n}$ to the key exchange algorithm unit 103.

<Shared Secret Key Sharing Unit 106>

The shared secret key sharing unit 106 obtains, using the related information x which is output by the key exchange algorithm unit 103 as input, shared secret information $mk_1^k, \ldots, mk_n^k$ by using the secret key and the shared secret information $mk_1^{k-1}, \ldots, mk_n^{k-1}$ and stores the shared secret information $mk_1^k, \ldots, mk_n^k$ in the shared secret key storage 102.

Next, the key exchange devices 200-$i$ will be described.

Figure 3:
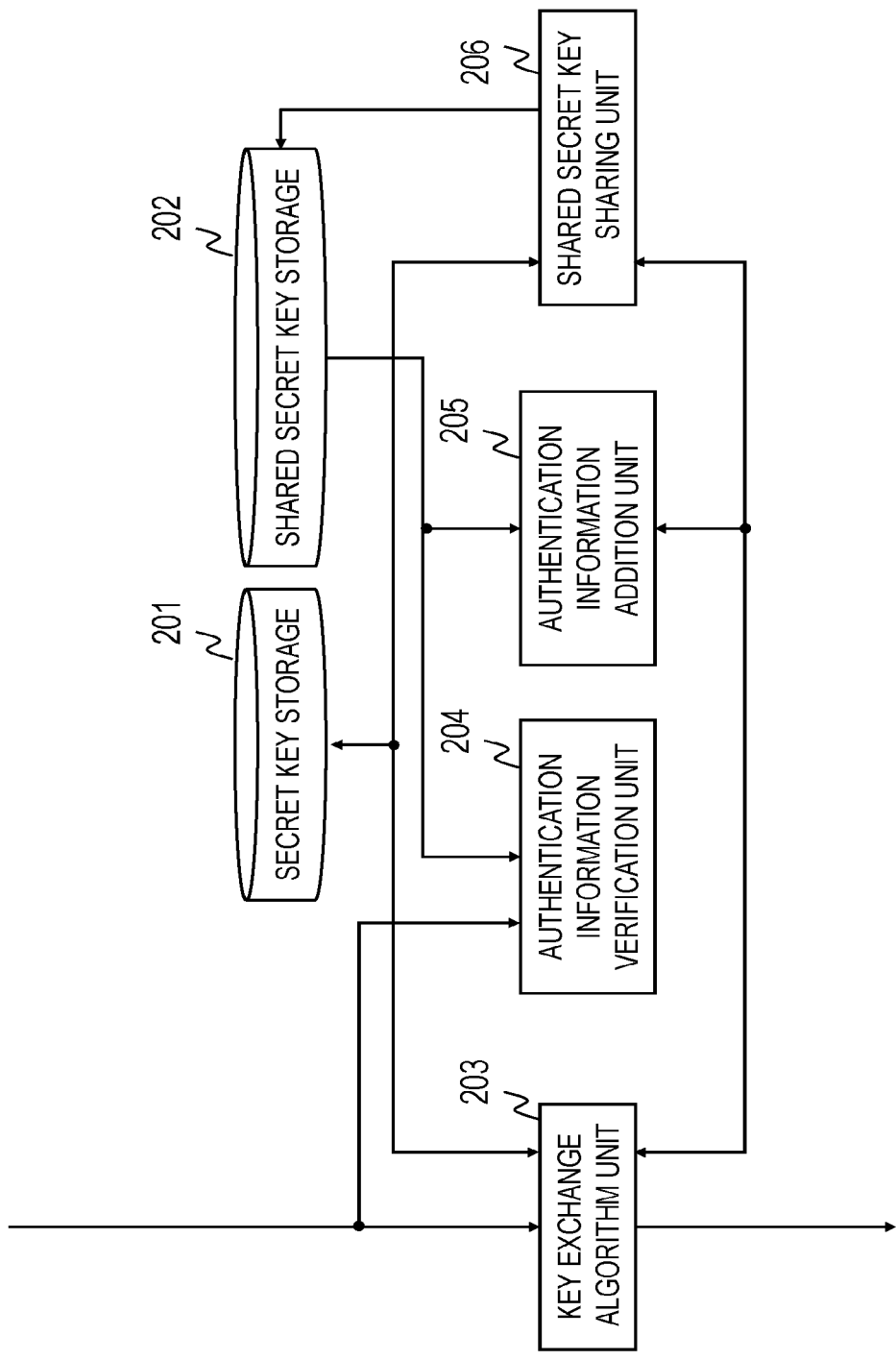
FIG. 3 is a functional block diagram of a key exchange device according to the first embodiment.

FIG. 3 is a functional block diagram of each key exchange device 200-$i$. The n key exchange devices 200-$i$ each include a secret key storage 201, a shared secret key storage 202, a key exchange algorithm unit 203, an authentication information verification unit 204, an authentication information addition unit 205, and a shared secret key sharing unit 206. First, the outline of processing which is performed in each unit will be described.

<Secret Key Storage 201>

In the secret key storage 201, a secret key of the key exchange device 200-$i$ is stored.

<Shared Secret Key Storage 202>

In the shared secret key storage 202, shared secret information $mk_i^k$, which is information different from the secret key of the key exchange device 200-$i$ and can be shared with the key exchange server device 100, is stored.

<Key Exchange Algorithm Unit 203>

The key exchange algorithm unit 203 accepts key exchange information $e_{s\_i}$ from the outside (the key exchange server device 100) as input, outputs related information x, which is generated in the course of a key exchange, to the shared secret key sharing unit 206, and outputs key exchange information $e_i$, which is necessary for a key exchange, to the outside (the key exchange server device 100).

<Authentication Information Verification Unit 204>

The authentication information verification unit 204 verifies, using authentication information $\sigma_{s\_i}$ from the outside (the key exchange server device 100) as input, the authentication information $\sigma_{s\_i}$ of the key exchange algorithm unit 203 by using shared secret information $mk_i^{k-1}$. If the authentication information $\sigma_{s\_i}$ is not successfully verified, the authentication information verification unit 204 stops the key exchange algorithm which is executed between the key exchange device 200-$i$ and the key exchange server device 100.

<Authentication Information Addition Unit 205>

The authentication information addition unit 205 generates, using the key exchange information $e_i$ output from the key exchange algorithm unit 203 as input, authentication information $\sigma_i$, by which authentication is performed and falsification is detected, for the key exchange information $e_i$ of the key exchange algorithm unit 203 by using the shared secret information $mk_i^{k-1}$ and transmits the authentication information $\sigma_i$ to the key exchange algorithm unit 203.

<Shared Secret Key Sharing Unit 206>

The shared secret key sharing unit 206 obtains, using the related information x, which is generated in the course of a key exchange in the key exchange algorithm unit 203, as input, shared secret information $mk_1^k, \ldots, mk_n^k$ by using the secret key and the shared secret information $mk_i^{k-1}$ and stores the shared secret information $mk_1^k, \ldots, mk_n^k$ in the shared secret key storage 202 of the key exchange device 200-$i$.

Hereinafter, the processing details of each unit will be described along the processing flow.

In the first embodiment, a KY protocol-based applied protocol is proposed. Like the KY protocol, the present applied protocol is configured with five phases: {Setup, Dist, Join, Leave, Update}. Although similar adaptation can also be made to {Join, Leave, Update} phases, only Setup and Dist phases will be described. Moreover, in the present applied protocol, a PKI-based KY protocol will be described on the assumption that a key exchange is performed between a server S and users u:={$u_1, u_2, \ldots, u_n | u_i \in U$}.

The present applied protocol uses a secret key of RSA encryption as a long-term secret key and a MAC key as a shared secret key in an initial shared secret key sharing step and a shared secret key update step. In the present applied protocol, at the time of sharing of a shared secret key, authentication is performed and falsification is detected using a signature of RSA encryption and a key is shared by DH key sharing. It is to be noted that the present invention can use, in addition to a signature of RSA encryption, a commonly used signature technique, such as DSA or ECDSA, which is used to perform authentication and detect falsification; likewise, as for DH key sharing, the present invention can use a commonly used key exchange technique.

In the present embodiment, since the fixed shared secret information scheme is adopted, authentication and prevention of falsification are performed by adding a MAC tag using an initial shared secret key $mk_i^0$ in a transmission-reception-time step in a j-th key exchange. However, it is also possible to adopt the fixed shared secret information scheme and perform authentication and prevention of falsification by adding a MAC tag using a MAC key $mk_i^k$ which is a previous or earlier shared secret key. Here, k is any one of integers greater than or equal to 0 and less than j, and it is only necessary to set k in advance between a certain device and another device between which a key exchange is performed.

In the existing KY protocol, a MAC key is created at the beginning of Dist and a MAC tag is generated for some communications of Dist. In the present embodiment, since a MAC key is used as a shared secret key, the protocol is configured without a MAC key. In addition thereto, the protocol is configured without a commitment $C_i = g^{k\_i} h^{s\_i}$ to check the identicalness of a user in Round1 and a user in Round2 and a commitment $C_1 = g^{k-1} h^{s-1}$ to check whether each user has $k_i$ and $s_i$ of a representative user (in the present embodiment, a user $u_1$ is assumed to be a representative user). Here, in subscripts and superscripts, A_B means $A_B$ and A/\B means $A^B$. Moreover, as a symbol that means choosing an element x of a set S uniformly and randomly from the set S, $x \in_R S$ is used.

Setup:

1. The key exchange algorithm unit 203 of the key exchange device 200-i which is used by each user $u_i$ generates, by using a key generation algorithm Gen of a public key cryptosystem (Gen, Enc, Dec), a secret key $sk_i$ and a public key $pk_i$ of the public key cryptosystem using k as a security parameter $((sk_i, pk_i) \leftarrow Gen(1^k))$. Furthermore, the key exchange algorithm unit 203 of the key exchange device 200-i generates secret information $(st_i, st'_i)$ consisting of a random bit string using k as a security parameter $(st_i \in_R Kspace_{78}, st'_1 \in_R \{0, 1\}^k)$.

The key exchange algorithm unit 203 stores $(sk_i, st_i, st'_i)$ in the secret key storage 201 as a long-term secret key $SSK_i$ and makes $pk_i$ public to the key exchange server device 100 as a long-term public key $SPK_i$ using a technique, such as PKI, of associating the public key $pk_i$ with a user.

2. The key exchange algorithm unit 103 of the key exchange server device 100 performs generation of a secret key of attribute-based encryption (Params, msk)←Setup($1^k$, att) by using information att, which is used to define attribute information $A_i$, using k as a security parameter. The key exchange algorithm unit 103 generates, by using the key generation algorithm Gen of the public key cryptosystem (Gen, Enc, Dec), a secret key $sk_s$ and a public key $pk_s$ of the public key cryptosystem using k as a security parameter $((sk_s, pk_s) \leftarrow Gen(1^k))$. Furthermore, the key exchange algorithm unit 103 generates secret information $(st_s, st'_s)$ consisting of a random bit string using k as a security parameter $(st_s \in_R Kspace_{78}, St'_s \in_R \{0, 1\}^k)$.

The key exchange algorithm unit 103 stores (msk, $sk_s$, $st_s$, $st'_s$) in the secret key storage 101 as a long-term secret key $SSK_s$, and stores (Params, p, G, g, h, TCR, tPRF, tPRF', F, F', F'', F''', $pk_s$) in an unillustrated storage as a long-term public key $SPK_s$ and makes (Params, p, G, g, h, TCR, tPRF, tPRF', F, F', F'', F''', $pk_s$) public to each key exchange device 200-i using a technique, such as PKI, of associating the public key $pk_s$ with a user.

Initial Shared Secret Key Sharing Step:

1. The shared secret key sharing unit 206 of each key exchange device 200-i acquires the long-term public key $SPK_s$ and creates random numbers $a_i$ and $g^{a\_i}$ using g contained in the long-term public key $SPK_s$. The shared secret key sharing unit 206 fetches the secret key $sk_i$ from the secret key storage 201, creates a signature $\sigma_i^0$ using the secret key $sk_i$ by a signature algorithm Sig ($\sigma_i^0 \leftarrow Sig_{sk\_i}(g^{a\_i})$), and passes the signature data to the key exchange algorithm unit 203. The key exchange algorithm unit 203 transmits ($g^{a\_i}$, $\sigma_i^0$) to the key exchange server device 100.

2. The shared secret key sharing unit 106 of the key exchange server device 100 receives ($g^{a\_i}$, $\sigma_i^0$) via the key exchange algorithm unit 103 and verifies the signature $\sigma_i^0$ using a verification algorithm Ver (1 or $\perp \leftarrow Ver_{pk\_i}(g^{a\_i}, \sigma_i^0)$). If the signature $\sigma_i^0$ is not successfully verified (if $\perp$ is output), the shared secret key sharing unit 106 stops the key exchange algorithm. If the signature $\sigma_i^0$ is successfully verified (if 1 is output), the shared secret key sharing unit 106 creates random numbers b and $g^b$ using g contained in the long-term public key $SPK_s$. The shared secret key sharing unit 106 fetches the secret key $sk_s$ from the secret key storage 101, creates a signature $\sigma_s^0$ using the secret key $sk_s$ by the signature algorithm Sig ($\sigma_s^0 \leftarrow Sig_{sk\_s}(g^b)$), and transmits ($g^b$, $\sigma_s^o$) to each key exchange device 200-i via the key exchange algorithm unit 103. Furthermore, the shared secret key sharing unit 106 creates $g^{a\_ib}$ using $g^{a\_i}$ received from each key exchange device 200-i and the created random number b and creates $mk_i^0 \leftarrow MGen(g^{ai\_b})$ using an algorithm MGen that generates a MAC key. The shared secret key sharing unit 106 stores $mk_i^0$ (where i=1, 2, ..., n) in the shared secret key storage 102 as a shared secret key.

3. The shared secret key sharing unit 206 of each key exchange device 200-i receives ($g^b$, $\sigma_s^0$) via the key exchange algorithm unit 203 and verifies the signature $\sigma_s^0$ using $pk_s$ contained in the long-term public key $SPK_s$ and the verification algorithm Ver (1 or $\perp \leftarrow Ver_{pk\_s}(g^b, \sigma_s^0)$). If the signature $\sigma_s^0$ is not successfully verified (if $\perp$ is output), the shared secret key sharing unit 206 stops the key exchange algorithm. If the signature $\sigma_s^0$ is successfully verified (if 1 is output), the shared secret key sharing unit 206 creates $g^{a\_ib}$ using the random number a, generated by the key exchange device 200-i and $g^b$ received from the key exchange server device 100 and creates $mk_i^0 \leftarrow MGen(g^{a\_ib})$ using the algorithm MGen that generates a MAC key. The shared secret key sharing unit 206 stores $mk_i^0$ (here, i is one value corresponding to the key exchange device 200-i) in the shared secret key storage 202 as a shared secret key.

By the processing discussed so far, the key exchange server device 100 and the key exchange device 200-i share the shared secret key $mk_i^0$.

Dist:

(State Update at New Time Frame)

A key exchange device 200-i that conducts a session for the first time in a specific $TF_{ti}$ performs the following process with the key exchange server device 100.

1. When receiving a connection request from the key exchange device 200-i, the key exchange algorithm unit 103 of the key exchange server device 100 creates $A_i = (u_i, time_{ji})$ from a time $time_{ji}$, which corresponds to the current time, in a specific segment and an identifier $u_i$ of a user and sets $A_i$ as attribute information. It is to be noted that, if a set of times in the specific segment including the time $time_{ji}$ in the specific segment is assumed to be $TF_{ji} := \{time_{ji\_1}, time_{ji\_2}, ..., time_{ji\_tn}\}$ ji is a value, of ji_1, ji_2, ..., ji_tn, corresponding to the current time. The key exchange algorithm unit 103 of the key exchange server device 100 generates an attribute secret key $usk_i$ of the user from Params, msk, and $A_i$ using an algorithm Der which is an encryption algorithm of attribute-based encryption and generates a key corresponding to attribute information of a user ($usk_i \leftarrow $Der(Params, msk, $A_i$)). Furthermore, the key exchange algorithm unit 103 acquires the public key $pk_i$ of the key exchange device 200-$i$, encrypts $usk_i$ by an encryption algorithm Enc of the public key cryptosystem using the public key $pk_i$ ($CT_i \leftarrow $Enc$_{pk\_i}(usk_i)$), and transmits cipher text $CT_i$ to the key exchange device 200-$i$. Here, i=1, 2, . . . , n.

2. Each key exchange device 200-$i$ receives the cipher text $CT_i$, fetches the secret key $sk_i$ from the secret key storage 201, decrypts the cipher text $CT_i$ by a decryption algorithm Dec of the public key cryptosystem ($usk_i \leftarrow $Dec$_{sk\_i}(CT_i)$), and stores the attribute secret key $usk_i$ in an unillustrated storage state$_i$.

(Round1 for Users)

1. The key exchange algorithm unit 203 of each key exchange device 200-$i$ creates $r\sim_i \in_R \{0, 1\}^k$, $r\sim'_i \in_R $Kspace$_\kappa$, $k\sim_i \in_R \{0, 1\}^k$, $k\sim'_i \in_R $Kspace$_\kappa$, $s\sim_i \in_R \{0, 1\}^\kappa$, and $s\sim'_i \in_R $Kspace$_\kappa$ and stores them in an unillustrated storage ESK$_i$. Then, the key exchange algorithm unit 203 generates $r_i$=tPRF($r\sim_i$, $r\sim'_i$, st$_i$, st'$_i$), $k_i$=tPRF($k\sim_i$, $k\sim'_i$, st$_i$, st'$_i$), and $s_i$=tPRF($s\sim_i$, $s\sim'_i$, st$_i$, st'$_i$). Furthermore, the key exchange algorithm unit 203 creates $R=g^{r\_i}$ and $C_i=g^{k\_i}h^{s\_i}$.

2. The authentication information addition unit 205 of each key exchange device 200-$i$ fetches the shared secret key $mk_i^{j-1}$ from the shared secret key storage 202 and calculates a signature $\sigma_i^1$ from the created $R_i$ and $C_i$ by a signature algorithm Tag by the following formula.

$$\sigma_i^1 = \text{Tag\_}(mk_i^{j-1})(R_i, C_i)$$

The key exchange algorithm unit 203 sends ($R_i$, $C_i$, $\sigma_i^1$) to the key exchange server device 100. Here, the meaning of Tag\_($mk_i^{j-1}$) is as follows.

$$Tag_{mk_i^{j-1}}$$

Moreover, in the present embodiment, since the fixed shared secret key scheme is adopted, $mk_i^{j-1} = mk_i^0$. It is to be noted that $R_i$ and $C_i$ are also referred to as key exchange information and the signature $\sigma_i^1$ is also referred to as authentication information.

(Round1 for Server)

1. The authentication information verification unit 104 of the key exchange server device 100 acquires ($R_i$, $C_i$, $\sigma_i^1$) from each key exchange device 200-$i$ via the key exchange algorithm unit 103, fetches the shared secret key $mk_i^{j-1}$ from the shared secret key storage 102, and verifies ($R_i$, $C_i$, $\sigma_i^1$) by the verification algorithm Ver by the following formula.

$$\text{Ver\_}(mk_i^{j-1})(R_i, C_i, \sigma_i^1)$$

If ($R_i$, $C_i$, $\sigma_i^1$) is not successfully verified, the authentication information verification unit 104 stops the key exchange algorithm. The authentication information verification unit 104 continues the key exchange algorithm only when ($R_i$, $C_i$, $\sigma_i^1$) is successfully verified. Here, the meaning of Ver\_($mk_i^{j-1}$) is as follows.

$$Ver_{mk_i^{j-1}}$$

2. The key exchange algorithm unit 103 of the key exchange server device 100 acquires ($R_i$, $C_i$, $\sigma_i^1$) from each key exchange device 200-$i$, calculates sid=TCR($C_1$, . . . , $C_n$), and selects one representative user. In the present embodiment, the user $u_i$ is assumed to be a representative user. The authentication information addition unit 105 calculates $\sigma_{sev\_i}^1 = $Tag\_($mk_i^{j-1}$)(sid, $R_{i-1}$, $R_{i+1}$) by the signature algorithm Tag using sid and $R_1$, . . . , $R_n$, sends (sid, $R_{i-1}$, $T_{i+1}$, $\sigma_{sev\_i}^1$) to each key exchange device 200-$i$ via the key exchange algorithm unit 103, and informs the representative user that he/she is a representative user.

(Round2 for Users)

1. The authentication information verification unit 204 of the key exchange device 200-$i$ (where $i \in [1, n]$) acquires (sid, $R_{i-1}$, $R_{i+1}$, $\sigma_{sev\_i}^1$) from the key exchange server device 100 via the key exchange algorithm unit 203 and verifies (sid, $R_{i-1}$, $R_{i+1}$, $\sigma_{sev\_i}^1$) by the verification algorithm Ver by the following formula.

$$\text{Ver\_}(mk_i^{j-1})(\text{sid}, R_{i-1}, R_{i+1}, \sigma_{sev\_i}^1)$$

If (sid, $R_{i-1}$, $R_{i+1}$, $\sigma_{sev\_i}^1$) is not successfully verified, the authentication information verification unit 204 stops the key exchange algorithm. The authentication information verification unit 204 continues the key exchange algorithm only when (sid, $R_{i-1}$, $R_{i+1}$, $\sigma_{sev\_i}^1$) is successfully verified. It is to be noted that sid, $R_{i-1}$, and $R_{i+1}$ are also referred to as key exchange information from the outside (the key exchange server device 100) and $\sigma_{sev\_i}^1$ is also referred to as authentication information.

2. The key exchange algorithm unit 203 of the key exchange device 200-$i$ (where $i \in [2, n]$) calculates $K_i^{(l)}=F$(sid, $R_{i-1}^{r\_i}$), $K_i^{(r)}=F$(sid, $R_{i+1}^{r\_i}$), and $T_i=K_i^{(l)}$ xor $K_i^{(r)}$. The meaning of xor is as follows.

$\oplus$

The authentication information addition unit 205 calculates a signature $\sigma_i^2$ using the signature algorithm Tag ($\sigma_i^2 = $Tag\_($mk_i^{j-1}$)($R_i$, $c_i$, $R_{i-1}$, $R_{i+1}$, $k_i$, $s_i$, $T_i$, $U_i$, sid)) and transmits ($k_i$, $s_i$, $T_i$, $\sigma_i^2$) to the key exchange server device 100 via the key exchange algorithm unit 203.

3. The key exchange algorithm unit 203 of the key exchange device 200-$i$ of the user $u_1$, who is a representative user, calculates $K_1^{(l)}=F$(sid, $R_n^{r\_1}$), $K_1^{(r)}=F$(sid, $R_2^{r\_1}$), $T_1=K_1^{(l)}$ xor $K_1^{(r)}$, and $T'=K_1^{(l)}$ xor ($k_1 \| s_1$). The authentication information addition unit 205 calculates a signature $\sigma_1^2$ using the signature algorithm Tag ($\sigma_1^2 = $Tag\_($mk_1^{j-1}$)($R_1$, $c_1$, $R_n$, $R_2$, $T_1$, T', $U_1$, sid)) and transmits ($T_1$, T', $\sigma_1^2$) to the key exchange server device 100 via the key exchange algorithm unit 203.

(Round2 for Server)

1. The authentication information verification unit 104 of the key exchange server device 100 acquires ($k_i$, $s_i$, $T_i$, $\sigma_i^2$) from the key exchange device 200-$i$ (where $i \in [2, n]$) via the key exchange algorithm unit 103 and verifies ($k_i$, $s_i$, $T_i$, $\sigma_i^2$) by the verification algorithm Ver by the following formula.

$$\text{Ver\_}(mk_i^{j-1})(R_i, c_i, R_{i-1}, R_{i+1}, k_i, s_i, T_i, U_i, \text{sid}, \sigma_i^2)$$

If ($k_i$, $s_i$, $T_i$, $\sigma_i^2$) is not successfully verified, the authentication information verification unit 104 stops the key exchange algorithm. The authentication information verification unit 104 continues the key exchange algorithm only when ($k_i$, $s_i$, $T_i$, $\sigma_i^2$) is successfully verified.

2. The authentication information verification unit 104 of the key exchange server device 100 acquires ($T_i$, T', $\sigma_1^2$) from a key exchange device 200-1 of the user $u_1$, who is a representative user, via the key exchange algorithm unit 103 and verifies ($T_i$, T', $\sigma_1^2$) by the verification algorithm Ver by the following formula.

$$\text{Ver\_}(mk_1^{j-1})(R_1, c_1, R_n, R_2, T_1, T', U_1, \text{sid}, \sigma_1^2)$$

If $(T_1, T', \sigma_1^2)$ is not successfully verified, the authentication information verification unit 104 stops the key exchange algorithm. The authentication information verification unit 104 continues the key exchange algorithm only when $(T_1, T', \sigma_1^2)$ is successfully verified.

3. The key exchange algorithm unit 103 of the key exchange server device 100 generates $k_S \sim \in_R \{0,1\}^k$, $k_S \sim' \in_R \text{Kspace}_K$, $K_1 \sim \in_R \{0,1\}^k$, and $K_1 \sim' \in_R \text{Kspace}_K$ and calculates $k_S = \text{tPRF}(k_S \sim, k_S \sim', st_s, st'_s)$, $K_1 = \text{tPRF}(K_1 \sim, K_1 \sim', st_s, st'_s)$, and $k' = (\text{xor}_{2 \leq i \leq n} k_i)$ xor $k_s$.

4. The key exchange algorithm unit 103 of the key exchange server device 100 calculates $T'_i = (\text{xor}_{i \leq j \leq i-1} T_j)$ for the key exchange device 200-$i$ (where $i \in [2, n]$).

5. The key exchange algorithm unit 103 of the key exchange server device 100 calculates $P_i := (\text{ID} = U_i) \wedge (\text{time} \in \text{TF})$ and $CT'_i = \text{AEnc}(\text{Params}, P_i, K_1)$ for the key exchange device 200-$i$ (where $i \in [1, n]$). It is to be noted that AEnc is an encryption algorithm of attribute-based encryption.

6. The authentication information addition unit 105 of the key exchange server device 100 calculates a signature $\sigma_i^2$ for the key exchange device 200-$i$ (where $i \in [2, n]$) using the signature algorithm Tag by the following formula.

$$\sigma_i^2 = \text{Tag\_}(mk_i^{j-1})(R_i, c_i, R_{i-1}, R_{i+1}, k_i, s_i, T_i, \text{sid}, c_1, k', T'_i, T', CT'_i)$$

Next, the authentication information addition unit 105 transmits $(c_1, k', T'_i, T', CT'_i, \sigma_i^2)$ to the key exchange device 200-$i$ (where $i \in [2, n]$) via the key exchange algorithm unit 103.

7. The authentication information addition unit 105 of the key exchange server device 100 calculates a signature $\sigma_1^2$ for the key exchange device 200-1 of the user $u_1$, who is a representative user, using the signature algorithm Tag by the following formula.

$$\sigma_1^2 = \text{Tag\_}(mk_i^{j-1})(R_1, c_1, R_n, R_2, T_1, T', U_1, \text{sid}, k', CT'_1)$$

Next, the authentication information addition unit 105 transmits $(k', CT'_1, \sigma_1^2)$ to the key exchange device 200-1 via the key exchange algorithm unit 103.

(Session Key Generation and Post Computation)

1. The authentication information verification unit 204 of the key exchange device 200-$i$ (where $i \in [2, n]$) acquires $(c_1, k', \text{sid}, T'_i, T', CT'_i, \sigma_i^2)$ from the key exchange server device 100 via the key exchange algorithm unit 203 and verifies $(c_1, k', \text{sid}, T'_i, T', CT'_i, \sigma_i^2)$ by the verification algorithm Ver by the following formula.

$$\text{Ver\_}(mk_i^{j-1})(R_i, c_i, R_{i-1}, R_{i+1}, k_i, s_i, T_i, U_i, \text{sid}, c_1, k', T'_i, T', CT'_i, \sigma_i^2)$$

If $(c_1, k', \text{sid}, T'_i, T', CT'_i, \sigma_i^2)$ is not successfully verified, the authentication information verification unit 204 stops the key exchange algorithm. The authentication information verification unit 204 continues the key exchange algorithm only when $(c_1, k', \text{sid}, T'_i, T', CT'_i, \sigma_i^2)$ is successfully verified.

2. The key exchange algorithm unit 203 of the key exchange device 200-$i$ calculates $K_1^{(1)} = T'_i$ xor $K_i^{(1)}$ and $k_1 \| s_1 = T'$ xor $K_1^{(1)}$ and decrypts cipher text $CT'_i$ by a decryption algorithm ADec of attribute-based encryption by the following formula.

$$K_1 \leftarrow \text{ADec}_{usk\_i}(CT'_i, P_i)$$

Furthermore, the key exchange algorithm unit 203 calculates $K_2 = F'(\text{sid}, k' \text{ xor } k_1)$ and obtains a session key SK by $SK = F''(\text{sid}, K_1) \text{ xor } F''(\text{sid}, K_2)$.

3. The key exchange algorithm unit 203 of the key exchange device 200-$i$ (where $i \in [2, n]$) stores sid, $H_i^{(1)} = R_{i-1}^{r\_i}$, $H_i^{(r)} = R_{i+1}^{r\_i}$ and $r = F'''(\text{sid}, K_1)$ xor $F'''(\text{sid}, K_2)$ in an unillustrated storage state$_i$.

4. The authentication information verification unit 204 of the key exchange device 200-1 of the user $u_1$, who is a representative user, acquires $(k', CT'_1, \sigma_1^2)$ from the key exchange server device 100 via the key exchange algorithm unit 203 and verifies $(k', CT'_1, \sigma_1^2)$ by the verification algorithm Ver by the following formula.

$$\text{Ver\_}(mk_i^{j-1})(R_1, c_1, R_n, R_2, T_1, T', U_1, \text{sid}, k', CT'_1, \sigma_1^2)$$

If $(k', CT'_1, \sigma_1^2)$ is not successfully verified, the authentication information verification unit 204 stops the key exchange algorithm. The authentication information verification unit 204 continues the key exchange algorithm only when $(k', CT'_1, \sigma_1^2)$ is successfully verified.

5. The key exchange algorithm unit 203 of the key exchange device 200-1 decrypts cipher text $CT'_1$ by the decryption algorithm ADec of attribute-based encryption by the following formula.

$$K_1 \leftarrow \text{ADec}_{usk\_1}(CT'_1, P_1)$$

Furthermore, the key exchange algorithm unit 203 calculates $K_2 = F'(\text{sid}, k' \text{ xor } k_1)$ and obtains a session key SK by $SK = F''(\text{sid}, K_1) \text{ xor } F''(\text{sid}, K_2)$.

6. The key exchange algorithm unit 203 of the key exchange device 200-1 stores sid, $H_1^{(1)} = R_n^{r\_i}$, $H_1^{(r)} = R_2^{r\_i}$, and $r = F'''(\text{sid}, K_1)$ xor $F'''(\text{sid}, K_2)$ in an unillustrated storage state$_1$.

<Effects>

The above configuration makes it possible for the key exchange devices to share a session key SK between the key exchange devices while concealing the session key SK from the key exchange server device and, by performing authentication using two types of information, shared secret information=a MAC key and a long-term secret key, prevent the session key from being inferred after the long-term key is leaked. Even if information on a long-term secret key of a server or user is leaked, it is possible to prevent an attacker from making a session key exchange unless a shared secret key is leaked.

For example, the shared secret information can be stored in a tamper-resistant area (such as an HSM of a server or a SIM of a smartphone) and used. By using information, such as a MAC key, whose key size is small and calculation costs are low as the shared secret information, it is possible to make effective use of a limited tamper-resistant area.

<Modifications>

In the present embodiment, a case where a key exchange is performed between a key exchange device and a key exchange server device, that is, a key exchange between a key exchange device and a key exchange server device has been described; the present invention may be applied to a key exchange between key exchange devices. It is only necessary to adopt a configuration in which a certain key exchange device functions as a key exchange device of the present embodiment and another key exchange device functions as a key exchange server device of the present embodiment.

<Point of a Second Embodiment>

A difference from the first embodiment will be mainly described.

In the present embodiment, the shared secret key of the above-described first embodiment is changed from a MAC key $(mk_i^{j-1})$ to a key of AES $(\text{key}_i^{j-1})$, information which is added to each communication is transmitted as cipher text $c'_i$ by AES, not a signature $\sigma_i$, and the key exchange algorithm is stopped if the cipher text $c'_i$ is not successfully decrypted.

Second Embodiment

Setup:

1. The key exchange algorithm unit 203 of the key exchange device 200-i which is used by each user $u_1$, generates, by using a key generation algorithm Gen of a public key cryptosystem (Gen, Enc, Dec), a secret key $sk_i$ and a public key $pk_i$ of the public key cryptosystem using k as a security parameter (($sk_i$, $pk_i$)←Gen($1^k$)). Furthermore, the key exchange algorithm unit 203 of the key exchange device 200-i generates secret information ($st_1$, $st'_1$) consisting of a random bit string using k as a security parameter ($st_i \in {}_R\text{Kspace}_\kappa$, $st'_i \in {}_R\{0, 1\}^k$).

The key exchange algorithm unit 203 stores ($sk_i$, $st_i$, $st'_i$) in the secret key storage 201 as a long-term secret key $SSK_i$ and makes $pk_i$ public to the key exchange server device 100 as a long-term public key $SPK_i$ using a technique, such as PKI, of associating the public key $pk_i$ with a user.

2. The key exchange algorithm unit 103 of the key exchange server device 100 performs generation of a secret key of attribute-based encryption (Params, msk)←Setup($1^k$, att) by using information att, which to is used to define attribute information $A_i$, using k as a security parameter. The key exchange algorithm unit 103 generates, by using the key generation algorithm Gen of the public key cryptosystem (Gen, Enc, Dec), a secret key $sk_s$ and a public key $pk_s$ of the public key cryptosystem using k as a security parameter (($sk_s$, $pk_s$)←Gen($1^k$)). Furthermore, the key exchange algorithm unit 103 generates secret information ($st_s$, $st'_s$) consisting of a random bit string using k as a security parameter ($st_s \in {}_R\text{Kspace}_\kappa$, $st'_s \in {}_R\{0, 1\}^k$).

The key exchange algorithm unit 103 stores (msk, $sk_s$, $st_s$, $st'_s$) in the secret key storage 101 as a long-term secret key $SSK_s$, and stores (Params, p, G, g, h, TCR, tPRF, tPRF', F, F', F'', F''', $pk_s$) in an unillustrated storage as a long-term public key $SPK_s$ and makes (Params, p, G, g, h, TCR, tPRF, tPRF', F, F', F'', F''', $pk_s$) public to each key exchange device 200-i using a technique, such as PKI, of associating the public key $pk_s$ with a user.

Initial Shared Secret Key Sharing Step:

1. The shared secret key sharing unit 206 of each key exchange device 200-i acquires the long-term public key $SPK_s$ and creates random numbers a, and $g^{a\_i}$ using g contained in the long-term public key $SPK_s$. The shared secret key sharing unit 206 fetches the secret key $sk_i$ from the secret key storage 201, creates a signature $\sigma_i^0$ using the secret key $sk_i$ by a signature algorithm Sig ($\sigma_i^0$←$\text{Sig}_{sk\_i}$($g^{a\_i}$)), and transmits ($g^{a\_i}$, $\sigma_i^0$) to the key exchange server device 100 via the key exchange algorithm unit 203.

2. The shared secret key sharing unit 106 of the key exchange server device 100 receives ($g^{a\_i}$, $\sigma_i^0$) via the key exchange algorithm unit 103 and verifies the signature $\sigma_i^0$ using a verification algorithm Ver (1 or $\wedge$←$\text{Ver}_{pk\_i}$($g^{a\_i}$, $\sigma_i^0$)). If the signature $\sigma_i^0$ is not successfully verified (if $\wedge$ is output), the shared secret key sharing unit 106 stops the key exchange algorithm. If the signature $\sigma_i^0$ is successfully verified (if 1 is output), the shared secret key sharing unit 106 creates random numbers b and $g^b$ using g contained in the long-term public key $SPK_s$. The shared secret key sharing unit 106 fetches the secret key $sk_s$ from the secret key storage 101, creates a signature $\sigma_s$ using the secret key $sk_s$ by the signature algorithm Sig ($\sigma_s$←$\text{Sig}_{sk\_s}$($g^b$)), and transmits ($g^b$, $\sigma_s$) to each key exchange device 200-i via the key exchange algorithm unit 103. Furthermore, the shared secret key sharing unit 106 creates $g^{a\_ib}$ using $g^{a\_i}$ received from each key exchange device 200-i and the created random number b and creates $\text{key}_i^0$←KeyGen($g^{a\_ib}$) using an algorithm KeyGen that generates an AES key. The shared secret key sharing unit 106 stores $\text{key}_i^0$ (where i=1, 2, ..., n) in the shared secret key storage 102 as a shared secret key.

3. The shared secret key sharing unit 206 of each key exchange device 200-i receives ($g^b$, $\sigma_s^0$) and verifies the signature $\sigma_s^0$ using $pk_s$ contained in the long-term public key SPK, and the verification algorithm Ver (1 or $\wedge$←$\text{Ver}_{pk\_s}$($g^b$, $\sigma_s^0$). If the signature $\sigma_s^0$ is not successfully verified (if $\wedge$ is output), the shared secret key sharing unit 206 stops the key exchange algorithm. If the signature $\sigma_s^0$ is successfully verified (if 1 is output), the shared secret key sharing unit 206 creates $g^{a\_ib}$ using the random number $a_i$ generated by the key exchange device 200-i and $g^b$ received from the key exchange server device 100 and creates $\text{key}_i^0$←KeyGen($g^{a\_ib}$) using the algorithm KeyGen that generates a key of AES. The shared secret key sharing unit 206 stores $\text{key}_i^0$ (here, i is one value corresponding to the key exchange device 200-i) in the shared secret key storage 202 as a shared secret key.

By the processing discussed so far, the key exchange server device 100 and the key exchange device 200-i share the shared secret key $\text{key}_i^0$.

Dist:

(State Update at New Time Frame)

A key exchange device 200-i that conducts a session for the first time in a specific $TF_{ti}$ performs the following process with the key exchange server device 100.

1. When receiving a connection request from the key exchange device 200-i, the key exchange algorithm unit 103 of the key exchange server device 100 creates $A_i$=($u_i$, $\text{time}_{ji}$) from a time $\text{time}_{ji}$, which corresponds to the current time, in a specific segment and an identifier $u_i$ of a user and sets $A_i$ as attribute information. It is to be noted that, if a set of times in the specific segment including the time $\text{time}_{ji}$ in the specific segment is assumed to be $TF_{ji}$:={$\text{time}_{ji\_1}$, $\text{time}_{ji\_2}$, ..., $\text{time}_{ji\_tn}$}, ji is a value, of ji_1, ji_2, ..., ji_tn, corresponding to the current time. The key exchange algorithm unit 103 of the key exchange server device 100 generates an attribute secret key usk, of the user from Params, msk, and $A_i$ using an algorithm Der which is an encryption algorithm of attribute-based encryption and generates a key corresponding to attribute information of a user ($usk_i$←Der(Params, msk, $A_i$)). Furthermore, the key exchange algorithm unit 103 acquires the public key $pk_i$ of the key exchange device 200-i, encrypts $usk_i$ by an encryption algorithm Enc of the public key cryptosystem using the public key $pk_i$ ($CT_i$←$\text{Enc}_{pk\_i}$($usk_i$)), and transmits cipher text $CT_i$ to the key exchange device 200-i. Here, i=1, 2, ..., n.

2. Each key exchange device 200-i receives the cipher text $CT_i$, fetches the secret key $sk_i$ from the secret key storage 201, decrypts the cipher text $CT_i$ by a decryption algorithm Dec of the public key cryptosystem ($usk_i$←$\text{Dec}_{sk\_i}$($CT_i$)), and stores the attribute secret key $usk_i$ in an unillustrated storage $\text{state}_i$.

(Round1 for Users)

1. The key exchange algorithm unit 203 of each key exchange device 200-i creates $r\sim_i \in {}_R\{0, 1\}^k$, $r\sim'_i \in {}_R\text{Kspace}_\kappa$, $k\sim_i \in {}_R\{0, 1\}^k$, $k\sim'_i \in {}_R\text{Kspace}_\kappa$, $s\sim_i \in {}_R\{0, 1\}^k$, and $s\sim'_i \in {}_R\text{Kspace}_\kappa$ and stores them in an unillustrated storage $ESK_i$. Then, the authentication information addition unit 205 generates $r_i$=tPRF($r\sim_i$, $r\sim'_i$, $st_i$, $st'_i$), $k_i$=tPRF($k\sim_i$, $k\sim'_i$, $st_i$, $st'_i$), and $s_i$=tPRF($s\sim_i$, $s\sim'_i$, $st_i$, $st'_i$). Furthermore, the authentication information addition unit 205 creates $R_i=g^{r\_i}$ and $C_i=g^{k\_i}h^{s\_i}$.

2. The authentication information addition unit 205 of each key exchange device 200-i fetches the shared secret key $key_i^{j-1}$ from the shared secret key storage 202 and calculates cipher text $c_i^1$ from the created $R_i$ and $C_i$ by the encryption algorithm Enc of the public key cryptosystem by the following formula.

$$c_i^1=\text{Enc}\_(key_i^{j-1})(R_i,C_i)$$

The authentication information addition unit 205 sends ($R_i$, $C_i$, $c_i^1$) to the key exchange server device 100 via the key exchange algorithm unit 203. Here, the meaning of Enc_($key_i^{j-1}$) is as follows.

$$Enc_{key_i^{j-1}}$$

Moreover, in the present embodiment, since the fixed shared secret key scheme is adopted, $key_i^{j-1}=key_i^0$.

(Round1 for Server)

1. The authentication information verification unit 104 of the key exchange server device 100 acquires ($R_i$, $C_i$, $c_i^1$) from each key exchange device 200-i via the key exchange algorithm unit 103, fetches the shared secret key $key_i^{j-1}$ from the shared secret key storage 102, calculates Enc_($key_i^{j-1}$)($R_i$, $C_i$) by the encryption algorithm Enc of the public key cryptosystem, and verifies whether the calculation result is equal to $c_i^1$. If it is not successfully verified that the calculation result is equal to $c_i^1$, the authentication information verification unit 104 stops the key exchange algorithm. The authentication information verification unit 104 continues the key exchange algorithm only when it is successfully verified that the calculation result is equal to $c_i^1$.

2. The key exchange algorithm unit 103 of the key exchange server device 100 acquires ($R_i$, $C_i$, $c_i^1$) from each key exchange device 200-i, calculates sid=TCR($C_1$, ..., $C_n$), and selects one representative user. In the present embodiment, a user $u_1$ is assumed to be a representative user. The authentication information addition unit 105 calculates $c_{sev\_i}^1$=Enc_($key_i^{j-1}$)(sid, $R_{i-1}$, $R_{i+1}$) by the encryption algorithm Enc of the public key cryptosystem using sid and $R_1$, ..., $R_n$ and sends (sid, $R_{i-1}$, $R_{i+1}$, $c_{sev\_i}^1$) to each key exchange device 200-i via the key exchange algorithm unit 103. In so doing, the key exchange algorithm unit 103 informs the representative user that he/she is a representative user.

(Round2 for Users)

1. The authentication information verification unit 204 of the key exchange device 200-i (where $i \in [1, n]$) acquires (sid, $R_{i-1}$, $R_{i+1}$, $c_{sev\_i}^1$) from the key exchange server device 100 via the key exchange algorithm unit 203, calculates Enc_($key_i^{j-1}$)(sid, $R_{i-1}$, $R_{i+1}$) by the encryption algorithm Enc of the public key cryptosystem, and verifies whether the calculation result is equal to $c_{sev\_i}^1$.

If it is not successfully verified that the calculation result is equal to $c_{sev\_i}^1$, the authentication information verification unit 204 stops the key exchange algorithm. The authentication information verification unit 204 continues the key exchange algorithm only when it is successfully verified that the calculation result is equal to $c_{sev\_i}^1$.

2. The key exchange algorithm unit 203 of the key exchange device 200-i (where $i \in [2, n]$) calculates $K_i^{(l)}$=F(sid, $R_{i-1}^{r\_i}$), $K_i^{(r)}$=F(sid, $R_{i+1}^{r\_i}$), and $T_i=K_i^{(l)}$ xor $K_i^{(r)}$, calculates $c_i^2$=Enc_($key_i^{j-1}$)($R_i$, $c_i$, $R_{i-1}$, $R_{i+1}$, $k_i$, $s_i$, $T_i$, $U_i$, sid) using the encryption algorithm Enc of the public key cryptosystem, and transmits ($k_i$, $s_i$, $T_i$, $c_i^2$) to the key exchange server device 100 via the key exchange algorithm unit 203.

3. The key exchange algorithm unit 203 of the key exchange device 200-i of the user $u_1$, who is a representative user, calculates $K_1^{(l)}$=F(sid, $R_n^{r\_1}$), $K_1^{(l)}$=F(sid, $R_2^{r\_1}$), $T_1=K_1^{(l)}$ xor $K_1^{(r)}$, and T'=$K_1^{(l)}$ xor ($k_1\|s_1$), calculates $c_1^2$=Enc_($key_1^{j-1}$)($R_1$, $c_1$, $R_n$, $R_2$, $T_1$, T', $U_1$, sid) using the encryption algorithm Enc of the public key cryptosystem, and transmits ($T_1$, T', $c_1^2$) to the key exchange server device 100 via the key exchange algorithm unit 203.

(Round2 for Server)

1. The authentication information verification unit 104 of the key exchange server device 100 acquires ($k_i$, $s_i$, $T_i$, $c_i^2$) from the key exchange device 200-i (where $i \in [2, n]$) via the key exchange algorithm unit 103, calculates Enc_($key_i^{j-1}$)($R_i$, $c_i$, $R_{i-1}$, $R_{i+1}$, $k_i$, $s_i$, $T_i$, $U_i$, sid) by the encryption algorithm Enc of the public key cryptosystem, and verifies whether the calculation result is equal to $c_i^2$. If it is not successfully verified that the calculation result is equal to $c_i^2$, the authentication information verification unit 104 stops the key exchange algorithm. The authentication information verification unit 104 continues the key exchange algorithm only when it is successfully verified that the calculation result is equal to $c_i^2$.

2. The authentication information verification unit 104 of the key exchange server device 100 acquires ($T_1$, T', $c_1^2$) from a key exchange device 200-1 of the user $u_1$, who is a representative user, via the key exchange algorithm unit 103, calculates Enc_($key_1^{j-1}$)($R_1$, $c_1$, $R_n$, $R_2$, $T_1$, T', $U_1$, sid) by the encryption algorithm Enc of the public key cryptosystem, and verifies whether the calculation result is equal to $c_1^2$. If it is not successfully verified that the calculation result is equal to $c_1^2$, the authentication information verification unit 104 stops the key exchange algorithm. The authentication information verification unit 104 continues the key exchange algorithm only when it is successfully verified that the calculation result is equal to $c_1^2$.

3. The key exchange algorithm unit 103 of the key exchange server device 100 generates $k_s\sim \in_R \{0, 1\}^k$, $k_s\sim' \in_R Kspace_K$, $K_1\sim \in_R \{0, 1\}^k$, and $K_1\sim' \in_R Kspace_K$ and calculates $k_S$=tPRF($k_S\sim$, $k_S\sim'$, $st_s$, $st'_s$), $K_1$=tPRF($K_1\sim$, $K_1\sim'$, $st_s$, $st'_s$), and k'=($xor_{2\leq i\leq n} k_i$) xor $k_s$.

4. The key exchange algorithm unit 103 of the key exchange server device 100 calculates $T_i'$=($xor_{i\leq j\leq i-1} T_j$) for the key exchange device 200-i (where $i \in [2, n]$).

5. The key exchange algorithm unit 103 of the key exchange server device 100 calculates $P_i$:=(ID=$U_i$)$\wedge$(time $\in$ TF) and $CT_i'$=AEnc(Params, $P_i$, $K_1$) for the key exchange device 200-i (where $i \in [1, n]$).

6. The authentication information addition unit 105 of the key exchange server device 100 calculates $c_{sev\_i}^2$=Enc_($key_i^{j-1}$)($R_i$, $c_i$, $R_{i-1}$, $R_{i+1}$, $k_i$, $s_i$, $T_i$, $U_i$, sid, $c_1$, k', $T_i'$, T', $CT_i'$) for the key exchange device 200-i (where $i \in [2, n]$) by the encryption algorithm Enc of the public key cryptosystem and transmits ($c_1$, k', $T_i'$, T', $CT_i'$, $c_{sev\_i}^2$) to the key exchange device 200-i (where $i \in [2, n]$) via the key exchange algorithm unit 103.

7. The authentication information addition unit 105 of the key exchange server device 100 calculates $c_{sev\_1}^2$=Enc_($key_i^{j-1}$)($R_1$, $c_1$, $R_n$, $R_2$, $T_1$, T', $U_1$, sid, k', $CT_1$) for the key exchange device 200-1 of the user $u_1$, who is a representative user, by the encryption algorithm Enc of the public key cryptosystem and transmits (k', $CT_1'$, $c_{sev\_1}^2$) to the key exchange device 200-1 via the key exchange algorithm unit 103.

(Session Key Generation and Post Computation)

1. The authentication information verification unit 204 of the key exchange device 200-$i$ (where $i \in [2, n]$) acquires ($c_1$, k', sid, $T'_i$, T', $CT'_i$, $c_{sev\_i}^2$) from the key exchange server device 100 via the key exchange algorithm unit 203, calculates Enc_(key$_i^{j-1}$)($R_i$, $c_i$, $R_{i-1}$, $k_i$, $s_i$, $T_i$, $U_i$, sid, $c_1$, k', $T'_i$, T', $CT'_i$) by the encryption algorithm Enc of the public key cryptosystem, and verifies whether the calculation result is equal to $c_{sev\_i}^2$. If it is not successfully verified that the calculation result is equal to $c_{sev\_i}^2$, the authentication information verification unit 204 stops the key exchange algorithm. The authentication information verification unit 204 continues the key exchange algorithm only when it is successfully verified that the calculation result is equal to $c_{sev\_i}^2$.

2. The key exchange algorithm unit 203 of the key exchange device 200-$i$ calculates $K_1^{(1)} = T'_i$ xor $K_1^{(1)}$ and $k_1$ $\mu s_1 = T'$ xor $K_1^{(1)}$ and decrypts the cipher text $CT'_i$ by a decryption algorithm ADec of attribute-based encryption by the following formula.

$$K_1 \leftarrow ADec_{usk\_i}(CT'_i, P_i)$$

Furthermore, the key exchange algorithm unit 203 calculates $K_2 = F'(sid, k' \text{ xor } k_1)$ and obtains a session key SK by $SK = F''(sid, K_1) \text{ xor } F''(sid, K_2)$.

3. The key exchange algorithm unit 203 of the key exchange device 200-$i$ (where $i \in [2, n]$) stores sid, $H_i^{(l)} = R_{i-1}^{r\_i}$, $H_i^{(r)} = R_{i+1}^{r\_i}$, and $r = F'''(sid, K_1) \text{ xor } F'''(sid, K_2)$ in an unillustrated storage state$_i$.

4. The authentication information verification unit 204 of the key exchange device 200-1 of the user $u_1$, who is a representative user, acquires (k', $CT'_1$, $c_{sev\_1}^2$) from the key exchange server device 100 via the key exchange algorithm unit 203, calculates Enc_(key$_1^{j-1}$)($R_1$, $c_1$, $R_n$, $R_2$, $T_1$, T', $U_1$, sid, k', $CT'_1$) by the encryption algorithm Enc of the public key cryptosystem, and verifies whether the calculation result is equal to $c_{sev\_1}^2$. If it is not successfully verified that the calculation result is equal to $c_{sev\_1}^2$, the authentication information verification unit 204 stops the key exchange algorithm. The authentication information verification unit 204 continues the key exchange algorithm only when it is successfully verified that the calculation result is equal to $c_{sev\_1}^2$.

5. The key exchange algorithm unit 203 of the key exchange device 200-1 decrypts the cipher text $CT'_1$ by the decryption algorithm ADec of attribute-based encryption by the following formula.

$$K_1 \leftarrow ADec_{usk\_1}(CT'_1, P_1)$$

Furthermore, the key exchange algorithm unit 203 calculates $K_2 = F'(sid, k' \text{ xor } k_1)$ and obtains a session key SK by $SK = F''(sid, K_1) \text{ xor } F''(sid, K_2)$.

6. The key exchange algorithm unit 203 of the key exchange device 200-1 stores sid, $H_1^{(l)} = R_n^{r\_i}$, $H_1^{(r)} = R_2^{r\_i}$, and $r = F'''(sid, K_1) \text{ xor } F'''(sid, K_2)$ in an unillustrated storage state$_i$.

<Effects>

By adopting this configuration, it is possible to obtain the same effects as those of the first embodiment.

<Point of a Third Embodiment>

A difference from the first embodiment will be mainly described.

In a third embodiment, a shared secret key update scheme is adopted. In the shared secret key update scheme, in addition to the steps of the fixed shared secret key scheme, the following step is inserted before sharing of a session key in the key exchange algorithm.

Shared secret key update step:

Before a j-th session key exchange is performed, a key exchange device 200-$i$ and another key exchange device 200-$m$ between which a key exchange is performed perform key sharing therebetween using long-term secret keys SSKs of their own and a shared secret key key$_i^k$ in a key exchange performed prior to the j-th key exchange (that is, k<j) and share a shared secret key key$_i^j$ in the j-th key exchange. In a communication which is performed when this sharing is performed, the key exchange device 200-$i$ and the other key exchange device 200-$m$ between which a key exchange is performed share the shared secret key key$_i^j$ while adding information for preventing spoofing and falsification using the long-term secret keys SSKs of their own and the shared secret key key$_i^k$ in a key exchange performed prior to the j-th key exchange (that is, k<j). After sharing the shared secret key key$_i^j$, the key exchange device 200-$i$ and the other key exchange device 200-$m$ between which a key exchange is performed store the new shared secret key key$_i^j$.

Third Embodiment

The first embodiment and the third embodiment differ in the processing details in Setup, the initial shared secret key sharing step, (Round2 for Users), (Round2 for Server), and (Session Key Generation and Post Computation). Differences will be mainly described.

Setup:

In the third embodiment, an embodiment in which attribute-based encryption is not used is described. It is to be noted that all the embodiments in the present specification can be configured with or without attribute-based encryption.

1. The key exchange algorithm unit 203 of the key exchange device 200-$i$ which is used by each user $u_i$ generates, by using a key generation algorithm Gen of a public key cryptosystem (Gen, Enc, Dec), a secret key $sk_i$ and a public key $pk_i$ of the public key cryptosystem using k as a security parameter (($sk_i$, $pk_i$)$\leftarrow$Gen($1^k$)). Furthermore, the key exchange algorithm unit 203 of the key exchange device 200-$i$ generates secret information ($st_i$, $st'_i$) consisting of a random bit string using k as a security parameter ($st_i \in_R$ Kspace$_\kappa$, $st'_i \in_R \{0, 1\}^k$).

The key exchange algorithm unit 203 stores ($sk_i$, $st_i$, $st'_i$) in the secret key storage 201 as a long-term secret key SSK$_i$ and makes $pk_i$ public to the key exchange server device 100 as a long-term public key SPK$_i$ using a technique, such as PKI, of associating the public key $pk_i$ with a user.

2. The key exchange algorithm unit 103 of the key exchange server device 100 generates, by using the key generation algorithm Gen of the public key cryptosystem (Gen, Enc, Dec), a secret key $sk_s$ and a public key $pk_s$ of the public key cryptosystem using k as a security parameter (($sk_s$, $pk_s$)$\leftarrow$Gen($1^k$)). Furthermore, the key exchange algorithm unit 103 generates secret information ($st_s$, $st'_s$) consisting of a random bit string using k as a security parameter ($st_s \in_R$ Kspace$_\kappa$, $st'_s \in_R \{0, 1\}^k$).

The key exchange algorithm unit 103 stores ($sk_s$, $st_s$, $st'_s$) in the secret key storage 101 as a long-term secret key SSK$_s$, and stores (p, G, g, h, TCR, tPRF, tPRF', F, F', F'', F''', $pk_s$) in an unillustrated storage as a long-term public key SPK$_s$ and makes (p, G, g, h, TCR, tPRF, tPRF', F, F', F'', F''', $pk_s$) public to each key exchange device 200-$i$ using a technique, such as PKI, of associating the public key $pk_s$ with a user.

Initial Shared Secret Key Sharing Step:

1. The shared secret key sharing unit 206 of each key exchange device 200-$i$ acquires the long-term public key $SPK_s$, obtains $a\sim_i$ by $a\sim_i \in_R \{0, 1\}^k$, $a\sim_i' \in_R Kspace_K$, and $a_i = tPRF(a\sim_i, a\sim_i', st_i, st'_i)$ using tPRF contained in the long-term public key $SPK_s$, stores $(a\sim_i, a\sim_i')$ in an unillustrated storage $ESK_i$, and creates $g^{a\_i}$. The shared secret key sharing unit 206 fetches the secret key $sk_i$ from the secret key storage 201, creates a signature $\sigma_i^0$ using the secret key $sk_i$ by a signature algorithm Sig ($\sigma_i^0 \leftarrow Sig_{sk\_i}(g^{a\_i})$), and transmits ($g^{a\_i}$, $\sigma_i^0$) to the key exchange server device 100 via the key exchange algorithm unit 203.

2. The shared secret key sharing unit 106 of the key exchange server device 100 receives ($g^{a\_i}$, $\sigma_i^0$) and verifies the signature $\sigma_i^0$ using a verification algorithm Ver (1 or $\wedge \leftarrow Ver_{pk\_i}(g^{a\_i}, \sigma_i^0)$). If the signature $\sigma_i^0$ is not successfully verified (if $\wedge$ is output), the shared secret key sharing unit 106 stops the key exchange algorithm. If the signature $\sigma_i^0$ is successfully verified (if 1 is output), the shared secret key sharing unit 106 continues the key exchange algorithm.

The shared secret key sharing unit 106 obtains $b_i$ for each key exchange device 200-$i$ by $b\sim_i \in_R \{0, 1\}^k$, $b\sim_i' \in_R Kspace_K$, and $b_i = tPRF(b\sim_i, b\sim_i', st_s, st'_s)$ using tPRF, stores ($b\sim_i$, $b\sim_i'$) in an unillustrated storage $ESK_s$, and creates $g^{b\_i}$.

The shared secret key sharing unit 106 fetches the secret key $sk_s$ from the secret key storage 101, creates a signature $\sigma_s^0$ using the secret key $sk_s$ by the signature algorithm Sig ($\sigma_s^0 \leftarrow Sig_{sk\_s}(g^{b\_i})$), and transmits ($g^{b\_i}$, $\sigma_s^0$) to each key exchange device 200-$i$ via the key exchange algorithm unit 103. Furthermore, the shared secret key sharing unit 106 creates $g^{a\_ib\_i}$ using $g^{a\_i}$ received from each key exchange device 200-$i$ and the created random number $b_i$ and creates $mk_i^0 \leftarrow MGen(g^{a\_ib\_i})$ using an algorithm MGen that generates a MAC key. The shared secret key sharing unit 106 stores $mk_i^0$ (where i=1, 2, ..., n) in the shared secret key storage 102 as a shared secret key.

3. The shared secret key sharing unit 206 of each key exchange device 200-$i$ receives ($g^{b\_i}$, $\sigma_s^0$) and verifies the signature $\sigma_s^0$ using $pk_s$ contained in the long-term public key SPK, and the verification algorithm Ver (1 or $\wedge \leftarrow Ver_{pk\_s}(g^{b\_i}, \sigma_i^0)$). If the signature $\sigma_s^0$ is not successfully verified (if $\wedge$ is output), the shared secret key sharing unit 206 stops the key exchange algorithm. If the signature $\sigma_s^0$ is successfully verified (if 1 is output), the shared secret key sharing unit 206 creates $g^{a\_ib\_i}$ using $a_i$ generated by the key exchange device 200-$i$ and $g^{b\_i}$ received from the key exchange server device 100 and creates $mk_i^0 \leftarrow MGen(g^{a\_ib\_i})$ using the algorithm MGen that generates a MAC key. The shared secret key sharing unit 206 stores $mk_i^0$ (here, i is one value corresponding to the key exchange device 200-$i$) in the shared secret key storage 202 as a shared secret key.

By the processing discussed so far, the key exchange server device 100 and the key exchange device 200-$i$ share the shared secret key $mk_i^0$.

(Round2 for Users)

1. The authentication information verification unit 204 of the key exchange device 200-$i$ (where i ∈ [1, n]) acquires (sid, $R_{i-1}$, $R_{i+1}$, $\sigma_{sev\_i}^1$) from the key exchange server device 100 via the key exchange algorithm unit 203 and verifies (sid, $R_{i-1}$, $R_{i+1}$, $\sigma_{sev\_i}^1$) by the verification algorithm Ver by the following formula.

$$Ver\_(mk_i^{j-1})(sid, R_{i-1}, R_{i+1}, \sigma_{sev\_i}^1)$$

If (sid, $R_{i-1}$, $R_{i+1}$, $\sigma_{sev\_i}^1$) is not successfully verified, the authentication information verification unit 204 stops the key exchange algorithm. The authentication information verification unit 204 continues the key exchange algorithm only when (sid, $R_{i-1}$, $R_{i+1}$, $\sigma_{sev\_i}^1$) is successfully verified.

2. The key exchange algorithm unit 203 of the key exchange device 200-$i$ (where i ∈ [2, n]) calculates $K_i^{(1)} = F$ (sid, $R_{i-1}^{r\_i}$), $K_i^{(r)} = F$(sid, $R_{i+1}^{r\_i}$), and $T_i = K_i^{(1)}$ xor $K_i^{(r)}$. Furthermore, the shared secret key sharing unit 206 obtains $d_i$ by $d\sim_i \in_R \{0, 1\}^k$, $d\sim_i' \in_R Kspace_K$, and $d_i = tPRF(d\sim_i, d\sim_i', st_i, st'_i)$, stores $(d\sim_i, d\sim_i')$ in the unillustrated storage $ESK_i$, and creates $g^{d\_i}$. The shared secret key sharing unit 206 calculates a signature $\sigma_i^2$ using a signature algorithm Tag ($\sigma_i^2 = Tag\_(mk_i^{j-1})(R_i, c_i, R_{i-1}, R_{i+1}, k_i, s_i, T_i, U_i, sid, g^{d\_i})$) and transmits ($k_i$, $s_i$, $T_i$, $g^{d\_i}$, $\sigma_i^2$) to the key exchange server device 100 via the key exchange algorithm unit 203.

3. The key exchange algorithm unit 203 of a user $u_1$, who is a representative user, calculates $K_1^{(1)} = F$(sid, $R_n^{r\_i}$), $K_1^{(r)} = F$(sid, $R_2^{r\_i}$), $T_1 = K_1^{(1)}$ xor $K_1^{(r)}$, and $T' = K_1^{(1)}$ xor ($k_1 \| s_1$). Furthermore, the shared secret key sharing unit 206 obtains $d_1$ by $d\sim_1 \in_R \{0, 1\}^k$, $d\sim_1' \in Kspace_K$, and $d_1 = tPRF(d\sim_1, d\sim_1', st_1, st'_1)$, stores $(d\sim_1, d\sim_1')$ in an unillustrated storage $ESK_1$, and creates $g^{d\_1}$. The shared secret key sharing unit 206 calculates a signature $\sigma_i^2$ using the signature algorithm Tag ($\sigma_i^2 = Tag\_(mk_1^{j-1})(R_1, c_1, R_n, R_2, T_1, T', U_1, sid, g^{d\_1})$) and transmits ($T_i$, T', $g^{d\_1}$, $\sigma_i^2$) to the key exchange server device 100 via the key exchange algorithm unit 203.

(Round2 for Server)

1. The authentication information verification unit 104 of the key exchange server device 100 acquires ($k_i$, $s_i$, $T_i$, $g^{d\_i}$, $\sigma_i^2$) from the key exchange device 200-$i$ (where i ∈ [2, n]) via the key exchange algorithm unit 103 and verifies ($k_i$, $s_i$, $T_i$, $g^{d\_i}$, $\sigma_i^2$) by the verification algorithm Ver by the following formula.

$$Ver\_(mk_i^{j-1})(R_i, c_i, R_{i-1}, R_{i+1}, k_i, s_i, T_i, U_i, sid, g^{d\_i}, \sigma_i^2)$$

If ($k_i$, $s_i$, $T_i$, $g^{d\_i}$, $\sigma_i^2$) is not successfully verified, the authentication information verification unit 104 stops the key exchange algorithm. The authentication information verification unit 104 continues the key exchange algorithm only when ($k_i$, $s_i$, $T_i$, $g^{d\_i}$, $\sigma_i^2$) is successfully verified.

2. The authentication information verification unit 104 of the key exchange server device 100 acquires ($k_i$, $s_i$, $T_i$, $g^{d\_1}$, $\sigma_i^2$) from the key exchange device 200-1 of the user $u_1$, who is a representative user, via the key exchange algorithm unit 103 and verifies ($k_i$, $s_i$, $T_i$, $g^{d\_1}$, $\sigma_i^2$) by the verification algorithm Ver by the following formula.

$$Ver\_(mk_i^{j-1})(R_i, c_i, R_{i-1}, R_{i+1}, k_i, s_i, T_i, U_i, sid, g^{d\_i}, \sigma_i^2)$$

If ($k_i$, $s_i$, $T_i$, $g^{d\_1}$, $\sigma_i^2$) is not successfully verified, the authentication information verification unit 104 stops the key exchange algorithm. The authentication information verification unit 104 continues the key exchange algorithm only when ($k_i$, $s_i$, $T_i$, $g^{d\_1}$, $\sigma_i^2$) is successfully verified.

3. The key exchange algorithm unit 103 of the key exchange server device 100 generates $k_S\sim \in_R \{0, 1\}^*$, $k_S\sim' \in_R Kspace_K$, $K_1\sim \in_R \{0, 1\}^*$, and $K_1\sim' \in_R Kspace_K$ and calculates $k_S = tPRF(k_S\sim, k_S\sim', st_s, st'_s)$, $K_1 = tPRF(K_1\sim, K_1\sim', st_s, st'_s)$, and $k' = (xor_{2 \leq i \leq n} k_i)$ xor $k_s$.

4. The shared secret key sharing unit 106 obtains $e_i$ by $e\sim_i \in_R \{0, 1\}^k$, $e\sim_i' \in_R Kspace_K$, and $e_i = tPRF(e\sim_i, e\sim_i', st_i, st'_i)$, stores ($e\sim_i$, $e\sim_i'$) in the unillustrated storage $ESK_s$, and creates $g^{e\_i}$. Furthermore, the shared secret key sharing unit 106 creates $g^{d\_ie\_i}$ using $g^{d\_i}$ received from each exchange device 200-$i$ and the created $g^{e\_i}$ and creates $mk_i^1 \leftarrow MGen(g^{d\_ie\_i})$ using the algorithm MGen that generates a MAC key. The shared secret key sharing unit 106 stores $mk_i^1$ (where i=1, 2, ..., n) in the shared secret key storage 102 as a shared secret key and deletes $mk_i^0$.

5. The key exchange algorithm unit 103 of the key exchange server device 100 calculates $T_i' = (xor_{i \leq j \leq i-1} T_j)$ for the key exchange device 200-$i$ (where i ∈ [2, n]).

6. The authentication information addition unit 105 of the key exchange server device 100 calculates a signature $\sigma_i^2$ for the key exchange device 200-$i$ (where $i \in [2, n]$) using the signature algorithm Tag by the following formula.

$$\sigma_i^2 = \text{Tag\_}(mk_i^{j-1})(R_i, c_i, R_{i-1}, R_{i+1}, k_i, s_i, T_i, U_i, \text{sid}, c_1, k', T_i', T', g^{e\_i})$$

Furthermore, the authentication information addition unit 105 transmits ($c_1$, k', sid, $T_i'$, T', $g^{e\_1}$, $\sigma_i^2$) to the key exchange device 200-$i$ (where $i \in [2, n]$) via the key exchange algorithm unit 103.

7. The authentication information addition unit 105 of the key exchange server device 100 calculates a signature $\sigma_i^2$ for the key exchange device 200-1 of the user $u_1$, who is a representative user, using the signature algorithm Tag by the following formula.

$$\sigma_i^2 = \text{Tag\_}(mk_i^{j-1})(R_1, c_1, R_n, R_2, T_1, T', U_1, \text{sid}, k', g^{e\_1})$$

Furthermore, the authentication information addition unit 105 transmits (k', $g^{e\_1}$, $\sigma_1^2$) to the key exchange device 200-1 via the key exchange algorithm unit 103.

(Session Key Generation and Post Computation)

1. The authentication information verification unit 204 of the key exchange device 200-$i$ (where $i \in [2, n]$) acquires ($c_1$, k', sid, $T_1$, T', $g^{e\_1}$, $\sigma_i^2$) from the key exchange server device 100 via the key exchange algorithm unit 203 and verifies ($c_1$, k', sid, $T_i'$, T', $g^{e\_1}$, $\sigma_1^2$) by the verification algorithm Ver by the following formula.

$$\text{Ver\_}(mk_i^{j-1})(R_i, c_i, R_{i-1}, R_{i+i}, k_i, s_i, T_i, U_i, \text{sid}, c_1, k', T_i', T', g^{e\_1}, \sigma_1^2)$$

If ($c_1$, k', sid, $T_i'$, T', $g^{e\_1}$, $\sigma_i^2$) is not successfully verified, the authentication information verification unit 204 stops the key exchange algorithm. The authentication information verification unit 204 continues the key exchange algorithm only when ($c_1$, k', sid, $T_i'$, T', $g^{e\_1}$, $\sigma_1^2$) is successfully verified.

2. The key exchange algorithm unit 203 of the key exchange device 200-$i$ calculates $K_1^{(1)} = T_i'$ xor $K_i^{(1)}$ and $k_1 \| s_1 = T'$ xor $K_1^{(1)}$ and calculates $K_1 = F'(\text{sid}, k' \text{ xor } k_1)$.

Furthermore, the key exchange algorithm unit 203 obtains a session key SK by $SK = F''(\text{sid}, K_1)$.

3. The key exchange algorithm unit 203 of the key exchange device 200-$i$ (where $i \in [2, n]$) stores sid, $H_i^{(1)} = R_{i-1}^{r\_i}$, $H_i^{(r)} = R_{i-1}^{r\_i}$, $r = F'''(\text{sid}, K_1)$ xor $F'''(\text{sid}, K_2)$ in an unillustrated storage state$_i$.

Furthermore, the shared secret key sharing unit 206 creates using $g^{e\_1}$ received from the key exchange server device 100 via the key exchange algorithm unit 203 and $g^{d\_1}$ created in Round2 for Users and creates $mk_i^1 \leftarrow \text{MGen}(g^{d\_ie\_i})$ using the algorithm MGen that generates a MAC key. The shared secret key sharing unit 206 stores $mk_i^1$ (where $i = 1, 2, \ldots, n$) in the shared secret key storage 202 as a shared secret key and deletes $mk_i^0$.

4. The key exchange algorithm unit 203 of the key exchange device 200-1 of the user $u_1$, who is a representative user, acquires (k', $g^{e\_1}$, $\sigma_1^2$) from the key exchange server device 100 and verifies (k', $g^{e\_1}$, $\sigma_1^2$) by the verification algorithm Ver by the following formula.

$$\text{Ver\_}(mk_1^{j-1})(R_1, c_1, R_n, R_2, T_1, T', U_1, \text{sid}, k', g^{e\_1}, \sigma_1^2)$$

If (k', $g^{e\_1}$, $\sigma_1^2$) is not successfully verified, the key exchange algorithm unit 203 stops the key exchange algorithm. The key exchange algorithm unit 203 continues the key exchange algorithm only when (k', $g^{e\_1}$, $\sigma_1^2$) is successfully verified.

5. The key exchange algorithm unit 203 of the key exchange device 200-1 calculates $K_1 = F'(\text{sid}, k' \text{ xor } k_1)$. Furthermore, the key exchange algorithm unit 203 obtains a session key SK by $SK = F''(\text{sid}, K_1)$.

6. The key exchange algorithm unit 203 of the key exchange device 200-1 stores sid, $H_1^{(1)} = R_n^{r\_i}$, $H_1^{(r)} = R_2^{r\_i}$, and $r = F'''(\text{sid}, K_1)$ xor $F'''(\text{sid}, K_2)$ in the unillustrated storage state Furthermore, the shared secret key sharing unit 206 creates $g^{d\_ie\_i}$ using $g^{e\_i}$ received from the key exchange server device 100 via the key exchange algorithm unit 203 and $g^{d\_i}$ created in Round2 for Users and creates $mk_i^1 \leftarrow \text{MGen}(g^{d\_ie\_i})$ using the algorithm MGen that generates a MAC key. The shared secret key sharing unit 206 stores $mk_i^1$ (where $i = 1, 2, \ldots, n$) in the shared secret key storage 202 as a shared secret key and deletes $mk_i^0$.

<Effects>

This configuration makes it possible to obtain the same effects as those of the first embodiment. In addition, it is possible to achieve a higher level of security by updating a shared secret key.

<Modifications>

In the present embodiment, a shared secret key is obtained as $mk_i^0 \leftarrow \text{MGen}(g^{a\_ib\_i})$ and $mk_i^1 \leftarrow \text{MGen}(g^{d\_ie\_i})$; a shared secret key may be obtained as $\text{seed} \leftarrow \text{TCR}(g^{a\_ib\_i})$, $mk_i^0 \leftarrow \text{MGen}(\text{seed})$, $\text{seedTCR} \leftarrow (g^{d\_ie\_i})$, and $mk_i^1 \leftarrow \text{MGen}(\text{seed})$.

In the present embodiment, the shared secret key $mk_i^1$ has been described; a shared secret key $mk_i^j$ may be updated in each session $j$. At the time of an update, it is possible to use, not only a previous shared secret key $mk_i^{j-1}$, but also an earlier shared secret key $mk_i^k$ ($0 < k < j$). The value of k only has to be identified in some way in advance between a certain device and another device between which a key exchange is performed.

<Point of a Fourth Embodiment>

A difference from the third embodiment will be mainly described.

In a fourth embodiment, the shared secret key update scheme is adopted.

However, unlike the third embodiment, as an update of a shared secret key, instead of performing a DH key update each time, a shared secret key and related information in a previous session are input to a pseudo-random function as input and an output value is used as an updated shared secret key.

It is to be noted that, in the fourth embodiment, related information is assumed to be a session key shared in the relevant session.

Fourth Embodiment

The third embodiment and the fourth embodiment differ in the processing details in (Round2 for Users), (Round2 for Server), and (Session Key Generation and Post Computation). Differences will be mainly described. (Round2 for Users) and (Round2 for Server) are respectively the same as (Round2 for Users) and (Round2 for Server) of the second embodiment.

In (Session Key Generation and Post Computation), the following processing is performed. It is assumed that $mk_i^0$ has been exchanged between the key exchange server device 100 and the key exchange device 200-$i$ by performing the same initial shared secret key sharing step as that of the third embodiment.

(Session Key Generation and Post Computation)

1. The authentication information verification unit 204 of the key exchange device 200-$i$ (where $i \in [2, n]$) acquires ($c_1$, k', sid, $T_i$, T', $\sigma_i^2$) from the key exchange server device 100 via the key exchange algorithm unit 203 and verifies ($c_1$, k', sid, $T'_i$, T', $\sigma_i^2$) by the verification algorithm Ver by the following formula.

$$\text{Ver}\_(mk_i^{j-1})(R_i,c_i,R_{i-1},R_{i+1},k_i,s_i,T_i,U_i,\text{sid},c_1,k',T_1',T', \sigma_i^2)$$

If ($c_1$, k', sid, $T'_1$, T', $\sigma_i^2$) is not successfully verified, the authentication information verification unit 204 stops the key exchange algorithm. The authentication information verification unit 204 continues the key exchange algorithm only when ($c_1$, k', sid, $T'_i$, T', $\sigma_i^2$) is successfully verified.

2. The key exchange algorithm unit 203 of the key exchange device 200-$i$ calculates $K_1^{(1)} = T'_i$ xor $K_i^{(1)}$ and $k_1 \| s_1 = T'$ xor $K_1^{(1)}$ and calculates $K_1 = F'(\text{sid}, k' \text{ xor } k_1)$.

Furthermore, the key exchange algorithm unit 203 obtains a session key SK by SK=F'(sid, $K_1$).

3. The key exchange algorithm unit 203 of the key exchange device 200-$i$ (where i ∈ [2, n]) stores sid, $H_i^{(1)} = R_{i-1}^{r-i}$, $H_i^{(r)} = R_{i+1}^{r-i}$, and r=F'''(sid, $K_1$) xor F'''(sid, $K_2$) in an unillustrated storage state$_i$.

Furthermore, the shared secret key sharing unit 206 inputs SK and $mk_i^0$ to a pseudo-random function PRF via the key exchange algorithm unit 203 and creates $mk_i^1 \leftarrow \text{PRF}(\text{SK}, mk_i^0)$. The shared secret key sharing unit 206 stores $mk_i^1$ (where i=1, 2, ..., n) in the shared secret key storage 202 as a shared secret key and deletes $mk_i^0$.

4. The key exchange algorithm unit 203 of a key exchange device 200-1 of a user $u_1$, who is a representative user, acquires (k', $\sigma_1^2$) from the key exchange server device 100 and verifies (k', $\sigma_1^2$) by the verification algorithm Ver by the following formula.

$$\text{Ver}\_(mk_i^{j-1})(R_1,c_1,R_n,R_2,T_1,T',U_1,\text{sid},k',\sigma_1^2)$$

If (k', $\sigma_1^2$) is not successfully verified, the key exchange algorithm unit 203 stops the key exchange algorithm. The key exchange algorithm unit 203 continues the key exchange algorithm only when (k', $\sigma_1^2$) is successfully verified.

5. The key exchange algorithm unit 203 of the key exchange device 200-1 calculates $K_1 = F'(\text{sid}, k' \text{ xor } k_1)$. Furthermore, the key exchange algorithm unit 203 obtains a session key SK by SK=F''(sid, $K_1$).

6. The key exchange algorithm unit 203 of the key exchange device 200-1 stores sid, $H_1^{(1)} = R_n^{r-i}$, $H_1^{(r)} = R_2^{r-i}$, and r=F'''(sid, $K_1$) xor F'''(sid, $K_2$) in an unillustrated storage state$_i$.

Furthermore, the shared secret key sharing unit 206 inputs SK and $mk_i^0$ to the pseudo-random function PRF via the key exchange algorithm unit 203 and creates $mk_i^1 \leftarrow \text{PRF}(\text{SK}, mk_i^0)$. The shared secret key sharing unit 206 stores $mk_i^1$ (where i=1, 2, ..., n) in the shared secret key storage 202 as a shared secret key and deletes $mk_i^0$.

After the above processing, in accordance with the above-described algorithm, every time Dist, Join, Leave, or Update is performed again, $mk_i^v \leftarrow \text{PRF}(\text{SK}, mk_i^{v-1})$ is performed in the (Session Key Generation and Post Computation) phase using a session key $SK^v$ (v ∈ N is assumed to be the number of times a key exchange is performed) to be shared when Dist, Join, Leave, or Update is performed, and an update of a shared secret key is performed.

<Effects>

This configuration makes it possible to obtain the same effects as those of the third embodiment.

<Other Modifications>

The present invention is not limited to the above embodiments and modifications. For example, the above-described various kinds of processing may be executed, in addition to being executed in chronological order in accordance with the descriptions, in parallel or individually depending on the processing power of a device that executes the processing or when necessary. In addition, changes may be made as appropriate without departing from the spirit of the present invention.

<Program and Recording Medium>

Further, various types of processing functions in the devices described in the above embodiments and modifications may be implemented on a computer. In that case, the processing details of the functions to be contained in each device are written by a program. With this program executed on the computer, various types of processing functions in the above-described devices are implemented on the computer.

This program in which the processing details are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage device of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the devices are assumed to be configured with a predetermined program executed on a computer. However, at least part of these processing details may be realized in a hardware manner.

What is claimed is:

1. A key exchange device comprising:
   processing circuitry and a memory, wherein
   on an assumption that i≠s, j is the number of times a key exchange is performed, and k is any one of integers greater than or equal to 0 and less than j,
   in the memory shared secret information $mk_i^k$ which is information different from a secret key of the key exchange device is stored;

the processing circuitry is configured to:
  generates authentication information $\sigma_i$, by which authentication is performed and falsification is detected, for key exchange information $e_i$, which is output to an outside, by using the shared secret information $mk_i^k$; and
  receive key exchange information $e_s$ and authentication information $\sigma_s$ corresponding to the key exchange information $e_s$ from the outside, verify the authentication information $\sigma_s$ using the shared secret information $mk_i^k$, and, if the authentication information $\sigma_s$ is not successfully verified, stop a key exchange,
the shared secret information $mk_i^k$ is a value that is used in a generation process in a key exchange,
in the memory a secret key of the key exchange device is stored, and
the processing circuitry is configured to obtain shared secret information $mk_i^j$ using related information x, which is generated in a course of a key exchange, the secret key, and the shared secret information $mk_i^k$.

2. The key exchange device according to claim 1, wherein the shared secret information is a MAC key or an AES key, and
when receiving the key exchange information $e_s$ from the outside and outputting the key exchange information $e_i$ to the outside, the key exchange device performs processing based on a KY protocol.

3. A key exchange system comprising:
a key exchange server device comprising processing circuitry and memory; and
n key exchange devices i each comprising processing circuitry and memory, wherein
on an assumption that $i \neq s$, $i = 1, 2, \ldots, n$, j is the number of times a key exchange is performed, and k is any one of integers greater than or equal to 0 and less than j,
in the memory of the key exchange device i shared secret information $mk_i^k$ which is information different from a secret key of the key exchange device i is stored,
the processing circuitry of the key exchange device i is configured to:
  generate authentication information $\sigma_i$, by which authentication is performed and falsification is detected, for key exchange information $e_1$, which is output to an outside, by using the shared secret information $mk_i^k$, and
  receive key exchange information $e_{s\_i}$ and authentication information $\sigma_{s\_i}$ corresponding to the key exchange information $e_{s\_i}$ from the outside, verify the authentication information $\sigma_{s\_i}$ using the shared secret information $mk_i^k$, and, if the authentication information $\sigma_{s\_i}$ is not successfully verified, stop a key exchange, and
in the memory of the key exchange device i a secret key of the key exchange device i is stored, and
the processing circuitry of the key exchange device i is configured to obtain shared secret information $mk_i^j$ using related information x, which is generated in a course of a key exchange, the secret key, and the shared secret information $mk_i^k$, and
in the memory of the key exchange server shared secret information $mk_1^k, \ldots, mk_n^k$ which is information different from a secret key of the key exchange server device is stored,
the processing circuitry of the key exchange server is configured to:
  generates authentication information $\sigma_{s\_1}, \ldots, \sigma_{s\_n}$, by which authentication is performed and falsification is detected, for key exchange information $e_{s\_1}, \ldots, e_{s\_n}$, which is output to the outside, by using the shared secret information $mk_1^k, \ldots, mk_n^k$, and
  receives key exchange information $e_1, \ldots, e_n$ and authentication information $\sigma_1, \ldots, \sigma_n$ corresponding to the key exchange information $e_1, \ldots, e_n$ from the outside, verify the authentication information $\sigma_1, \ldots, \sigma_n$ using the shared secret information $mk_1^k, \ldots, mk_n^k$, and, if certain authentication information is not successfully verified, stops a key exchange which is performed between the key exchange server device and a key exchange device whose authentication information has not been successfully verified.

4. The key exchange system according to claim 3, wherein the shared secret information is a MAC key or an AES key, and
when receiving the key exchange information $e_1, \ldots, e_n$ from the outside and outputting the key exchange information $e_{s\_1}, \ldots, e_{s\_n}$ to the outside, the key exchange system performs processing based on a KY protocol.

5. A key exchange method that uses a key exchange device that includes processing circuitry and memory,
on an assumption that $i \neq s$, j is the number of times a key exchange is performed, k is any one of integers greater than or equal to 0 and less than j, and, in the memory of the key exchange device, shared secret information $mk_i^k$ which is information different from a secret key of the key exchange device is stored,
the key exchange method comprising:
an authentication information addition step in which the processing circuitry of the key exchange device generates authentication information $\sigma_i$, by which authentication is performed and falsification is detected, for key exchange information $e_i$, which is output to an outside, by using the shared secret information $mk_i^k$; and
an authentication information verification step in which the processing circuitry of the key exchange device receives key exchange information $e_s$ and authentication information $\sigma_s$ corresponding to the key exchange information $e_s$ from the outside, verifies the authentication information $\sigma_s$ using the shared secret information $mk_i^k$, and, if the authentication information $\sigma_s$ is not successfully verified, stops a key exchange, wherein
the shared secret information $mk_i^k$ is a value that is used in a generation process in a key exchange,
in the memory a secret key of the key exchange device is stored, and
the key exchange method comprises a shared secret key sharing step in which the processing circuitry of the key exchange device obtains shared secret information $mk_i^j$ using related information x, which is generated in a course of a key exchange, the secret key, and the shared secret information $mk_i^k$.

6. A key exchange method that uses a key exchange server device that includes processing circuitry and memory and n key exchange devices i that each include processing circuitry and memory,
on an assumption that $i \neq s$, $i = 1, 2, \ldots, n$, j is the number of times a key exchange is performed, k is any one of integers greater than or equal to 0 and less than j, in the memory shared secret key storage of each key exchange device i, shared secret information $mk_i^k$ which is information different from a secret key of the key exchange device i is stored, and, in the memory of the key exchange server device, shared secret information $mk_i^k$, $mk_n^k$ which is information different from a secret key of the key exchange server device is stored,
the key exchange method comprising:
an initial shared secret key sharing step in which the processing circuitry of the key exchange server device and the processing circuitry of the n key exchange devices i share the shared secret information $mk_i^k$;
an authentication information addition step in which the processing circuitry of the key exchange device i generates authentication information $\sigma_i$, by which authentication is performed and falsification is detected, for key exchange information $e_i$ which is output to an outside, by using the shared secret information $mk_i^k$;
a second authentication information verification step in which the processing circuitry of the key exchange server device receives key exchange information $e_1, \ldots, e_n$ and authentication information $\sigma_1, \ldots, \sigma_n$ corresponding to the key exchange information $e_1, \ldots, e_n$ from the outside, verifies the authentication information $\sigma_1, \ldots, \sigma_n$ using the shared secret information $mk_i^k, , mk_n^k$, and, if certain authentication information is not successfully verified, stops a key exchange which is performed between the key exchange server device and a key exchange device whose authentication information has not been successfully verified;
a second authentication information addition step in which the processing circuitry of the key exchange server device generates authentication information $\sigma_{s\_1}, \ldots, \sigma_{s\_n}$, by which authentication is performed and falsification is detected, for key exchange information $e_{s\_1}, \ldots, e_{s\_n}$, which is output to the outside, by using the shared secret information $mk_i^k$, $mk_n^k$; and
an authentication information verification step in which the processing circuitry of the key exchange device i receives key exchange information $e_{s\_i}$ and authentication information $\sigma_{s\_i}$ corresponding to the key exchange information $e_{s\_i}$ from the outside, verifies the authentication information $\sigma_{s\_i}$ using the shared secret information $mk_i^k$, and, if the authentication information $\sigma_{s\_i}$ is not successfully verified, stops a key exchange, wherein
the shared secret information $mk_i^k$ is a value that is used in a generation process in a key exchange,
in the memory of the key exchange device i a secret key of the key exchange device i is stored, and
the key exchange method comprises a shared secret key sharing step in which the processing circuitry of the key exchange device i obtains shared secret information $mk_i^j$ using related information x, which is generated in a course of a key exchange, the secret key, and the shared secret information $mk_i^k$.

7. A non-transitory computer-readable recording medium having recorded thereon a key exchange program for making a computer function as the key exchange device according to claim 1.

8. A non-transitory computer-readable recording medium having recorded thereon a key exchange program for making a computer function as the key exchange device according to claim 2.

* * * * *